(12) United States Patent
Choi et al.

(10) Patent No.: US 11,909,673 B2
(45) Date of Patent: Feb. 20, 2024

(54) METHOD AND DEVICE FOR TRANSMITTING UPLINK CONTROL CHANNEL IN WIRELESS CELLULAR COMMUNICATION SYSTEM

(71) Applicant: Samsung Electronics Co., Ltd., Suwon-si (KR)

(72) Inventors: Seunghoon Choi, Seongnam-si (KR); Youngbum Kim, Seoul (KR); Taehyoung Kim, Seoul (KR); Sungjin Park, Incheon (KR); Jinyoung Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/947,741

(22) Filed: Sep. 19, 2022

(65) Prior Publication Data

US 2023/0025287 A1   Jan. 26, 2023

Related U.S. Application Data

(63) Continuation of application No. 16/635,362, filed as application No. PCT/KR2018/008722 on Jul. 31, 2018, now Pat. No. 11,451,350.

(30) Foreign Application Priority Data

Aug. 10, 2017 (KR) .................... 10-2017-0101938
Nov. 22, 2017 (KR) .................... 10-2017-0156583
Jan. 12, 2018 (KR) .................... 10-2018-0004214

(51) Int. Cl.
*H04L 5/00* (2006.01)
*H04W 72/21* (2023.01)
(Continued)

(52) U.S. Cl.
CPC ............ *H04L 5/0012* (2013.01); *H04J 13/18* (2013.01); *H04L 5/0048* (2013.01);
(Continued)

(58) Field of Classification Search
CPC ... H04L 5/0012; H04L 5/0048; H04L 5/0007; H04L 5/0055; H04L 5/0016;
(Continued)

(56) References Cited

U.S. PATENT DOCUMENTS 10,334,591 B2 * 6/2019 Chae .................... H04W 76/14
11,477,791 B2 * 10/2022 Hwang ................ H04W 76/27
(Continued)

FOREIGN PATENT DOCUMENTS

CN    102083223 A    6/2011
CN    105917719 A    8/2016
(Continued)

OTHER PUBLICATIONS

R1-1711677—Summary of the E-mail Discussion [89-21]: On Long PUCCH for NR.*
(Continued)

*Primary Examiner* — Jay P Patel
(74) *Attorney, Agent, or Firm* — Jefferson IP Law, LLP

(57) ABSTRACT

Disclosed are: a communication technique for merging, with IoT technology, a 5G communication system for supporting a data transmission rate higher than that of a 4G system; and a system therefor. The present disclosure can be applied to intelligent services (for example, smart home, smart building, smart city, smart car or connected car, healthcare, digital education, retail, security and safety related services, and the like) on the basis of 5G communication technology and IoT related technology. The present invention discloses various methods and devices for transmitting a long PUCCH.

16 Claims, 11 Drawing Sheets

(51) Int. Cl.
   *H04J 13/18*      (2011.01)
   *H04W 72/0453*   (2023.01)
   *H04W 72/044*    (2023.01)

(52) U.S. Cl.
   CPC ... *H04W 72/0453* (2013.01); *H04W 72/0466* (2013.01); *H04W 72/21* (2023.01)

(58) Field of Classification Search
   CPC ............ H04L 5/0053; H04W 72/0453; H04W 72/0466; H04W 72/21
   See application file for complete search history.

(56) References Cited

U.S. PATENT DOCUMENTS

| | | |
|---|---|---|
| 2011/0206089 A1 | 8/2011 | Cho et al. |
| 2016/0014753 A1 | 1/2016 | Wu et al. |
| 2017/0064693 A1 | 3/2017 | Kim et al. |
| 2017/0195163 A1* | 7/2017 | Chae ..................... H04W 8/005 |
| 2017/0223695 A1 | 8/2017 | Kwak et al. |
| 2017/0331577 A1 | 11/2017 | Parkvall et al. |
| 2018/0110041 A1 | 4/2018 | Bendlin et al. |
| 2018/0124815 A1 | 5/2018 | Papasakellariou |
| 2018/0376499 A1 | 11/2018 | Fu et al. |
| 2019/0069312 A1 | 2/2019 | Oh et al. |
| 2019/0174524 A1 | 6/2019 | Yoshimura et al. |
| 2019/0174540 A1 | 6/2019 | Yoshimura et al. |
| 2019/0199477 A1 | 6/2019 | Park et al. |
| 2019/0229860 A1 | 7/2019 | Yoshimura et al. |
| 2019/0229861 A1 | 7/2019 | Yoshimura et al. |
| 2020/0028640 A1 | 1/2020 | Yeo et al. |
| 2020/0059332 A1 | 2/2020 | Takeda et al. |
| 2020/0077432 A1 | 3/2020 | Xiong et al. |
| 2020/0120680 A1* | 4/2020 | Hwang ..................... H04L 1/00 |
| 2020/0229177 A1 | 7/2020 | Zou et al. |
| 2020/0245350 A1 | 7/2020 | Lee et al. |
| 2021/0185706 A1 | 6/2021 | Park et al. |

FOREIGN PATENT DOCUMENTS

| | | | |
|---|---|---|---|
| CN | 106685581 A | 5/2017 | |
| EP | 3742837 A1 * | 11/2020 | ........... H04L 5/0007 |
| EP | 3745793 A1 * | 12/2020 | ........... H04L 5/0053 |
| KR | 10-2018-0035649 A | 4/2018 | |
| WO | 2011/106996 A1 | 9/2011 | |
| WO | 2017/044066 A1 | 3/2017 | |
| WO | 2017/078458 A1 | 5/2017 | |
| WO | 2017/098414 A1 | 6/2017 | |

OTHER PUBLICATIONS

LG Electronics, "Design of long NR-PUCCH format", 3GPP TSG RANn WG1 Meeting #88bis, R1-1704909, Spokane, USA Apr. 3-7, 2017.

INTEL Corp., "Structure of 1~2 bits HARQ-ACK long PUCCH with TDM DMRS", 3GPP TSG RA WG1 Meeting #89, R1-1707392, Hangzhou, China, May 15-19, 2017.

QUALCOMM Inc., "Channel multiplexing for long PUCCH", 3GPP TSG RAN WG1 Meeting #89, R1-1708619, Hangzhou, CN May 15-19, 2017.

LG Electronics, "Resource configuration for long NR-PUCCH", 3GPP TSG RAN WG1 Meeting #88bis, R1-1704910, Spokane, USA Apr. 3-7, 2017.

Decision of Rejection dated Feb. 21, 2023, issued in Korean Application No. 10-2018-0004214.

Chinese Office Action dated Feb. 22, 2023, issued in Chinese Application No. 201880062378.0.

Ericsson, "On the Design of Long PUCCH for 1-2 bits UCI", R1-1709084, 3GPP TSG RAN WG1 Meeting #89, Hangzhou, China, May 7, 2017.

Intel Corporation, "Time and frequency domain resource allocation for long PUCCH", R1-1707396, 3GPP TSG RAN WG1 Meeting #89, Hangzhou, China, May 7, 2017.

LG Electronics at el, "WF on Structure of Long duration NR-PUCCH for up to 2 bits", R1-1709504, 3GPP TSG RAN WG1 Meeting #89, Hangzhou, China, May 17, 2017.

Intel Corporation, "Configurations of various long PUCCH lengths", R1-1707393, 3GPP TSG RAN WG1 Meeting #89, Hangzhou, China, May 7, 2017.

Samsung, "Performance Results for Long PUCCH", R1-1708007, 3GPP TSG RAN WG1 Meeting #89, Hangzhou, China, May 6, 2017.

Ericsson: "Summary of the E-mail Discussion [89-22: On Long PUCCH for NR", 3GPP Draft; R1-1711677, 3rd Generation Partnership Project (3GPP), Mobile Competence Centre ; 650, Route Des Lucioles ; F-06921 Sophia-Antipolis Cedex; France, vol. RAN WG1, No. Qingdao, China; Jun. 27, 2017-Jun. 30, 2017 Jun. 28, 2017 (Jun. 28, 2017), XP051305948.

SAMSUNG: "Long PUCCH for UCI of 1 or 2 Bits", 3GPP Draft; R1-1713627 Long PUCCH 1-2 Bits, 3rd Generation Partnership Project (3GPP), Mobile Competence Centre ; 650, Route Des Lucioles ; F-06921 Sophia-Antipolis Cedex ; France, vol. RAN WG1, No. Prague, Czech Republic; Aug. 21, 2017-Aug. 25, 2017 Aug. 20, 2017 (Aug. 20, 2017), XP051316427.

Extended European Search Report dated Jun. 9, 2020, issued in European Application No. 18843228.0.

Catt, R1-1710086, Long PUCCH for moderate and large UCI payloads, 3GPP TSG RAN WG1 #AH, Qingdao, P.R. China Jun. 27-30, 2017.

Korean Office Action dated Sep. 19, 2022, issued in Korean Application No. 10-2018-0004214.

Decision of Rejection dated Jun. 5, 2023, issued in Korean Application No. 10-2018-0004214.

Notice of Allowance dated Jul. 20, 2023, issued in Chinese Application No. 201880062378.0.

Korean Notice of Allowance with English translation dated Oct. 27, 2023; Korean Appln No. 10-2023-0118517.

* cited by examiner

METHOD AND DEVICE FOR TRANSMITTING UPLINK CONTROL CHANNEL IN WIRELESS CELLULAR COMMUNICATION SYSTEM

CROSS-REFERENCE TO RELATED APPLICATION(S)

This application is a continuation application of prior application Ser. No. 16/635,362 filed on Jan. 30, 2020; which has issued as U.S. Pat. No. 11,451,350 on Sep. 20, 2022, which is a U.S. National Stage application under 35 U.S.C. § 371 of an International application number PCT/KR2018/008722 filed on Jul. 31, 2018, which is based on and claims priority of a Korean patent application number 10-2017-0101938, filed on Aug. 10, 2017, in the Korean Intellectual Property Office, and of a Korean patent application number 10-2017-0156583, filed on Nov. 22, 2017, in the Korean Intellectual Property Office, and of a Korean patent application number, 10-2018-0004214, filed on Jan. 12, 2018, in the Korean Intellectual Property Office, the disclosure of each of which is incorporated by reference herein in its entireties.

TECHNICAL FIELD

The disclosure relates to a method and a device for transmitting uplink control channels in a wireless cellular communication system.

BACKGROUND ART

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance.

Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields, such as a smart home, smart building, smart city, smart car, connected car, smart grid, health care, smart home appliance, or high-tech medical service, through the convergence of the conventional Information Technology (IT) and various industries.

Accordingly, various attempts to apply the 5G communication to the IoT network are made. For example, the 5G communication technology, such as a sensor network, machine-to-machine (M2M) communication, and machine-type communication (MTC), has been implemented by a technique, such as beamforming, MIMO, and array antennas. The application of a cloud RAN as the big data processing technology may be an example of convergence of the 5G technology and the IoT technology.

Meanwhile, various research has been conducted on a method of transmitting an uplink control channel in a communication system. In particular, a method of transmitting a long physical uplink control channel (PUCCH) is under discussion in various aspects.

DISCLOSURE OF INVENTION

Technical Problem

The disclosure relates to a method of transmitting a long PUCCH and provides a method and a device for applying a frequency hopping scheme according to the number of symbols and spreading code to support terminal multiplexing according to the frequency hopping scheme by enabling the transmission of long PUCCHs in various numbers of symbols.

Solution to Problem

In order to solve the above-described problems, a method of a terminal according to an embodiment may include: generating uplink control information; determining the number N of a plurality of symbols in which the uplink control information is to be transmitted; mapping the uplink control information and demodulation reference signals (DMRSs) for the uplink control information to the plurality of symbols; and transmitting the uplink control information and the DMRSs to a base station, wherein if frequency hopping is applied to the transmission of the uplink control information, the number of symbols in the first hop is floor(N/2), and the number of symbols in the second hop is ceil(N/2).

According to another embodiment, the method of a terminal may further include receiving, from the base station, a message including information indicating the number N of the plurality of symbols and information indicating the application of frequency hopping.

According to another embodiment, the message may further include information indicating a frequency resource of the first hop and a frequency resource of the second hop.

According to another embodiment, the method of a terminal may further include receiving, from the base station, a message including information indicating an orthogonal cover code (OCC) to be applied to the uplink control information, and a sequence identified by the information indicating the OCC may be applied to the uplink control information and the DMRS.

According to another embodiment, sequences to be applied to uplink control information transmitted in the first hop, a DMRS transmitted in the first hop, uplink control information transmitted in the second hop, and a DMRS transmitted in the second hop are determined from among the sequences of different lengths identified by the information indicating the OCC.

In order to solve the above-described problems, a terminal according to an embodiment may include: a transceiver configured to transmit and receive signals; and a controller configured to generate uplink control information, determine the number N of a plurality of symbols in which the uplink control information is to be transmitted, map the uplink control information and demodulation reference signals (DMRSs) for the uplink control information to the plurality of symbols, and transmit the uplink control information and the DMRSs to a base station, wherein, if frequency hopping is applied to the transmission of the uplink control information, the number of symbols in the first hop is floor(N/2), and the number of symbols in the second hop is ceil(N/2).

In order to solve the above-described problems, a method of a base station according to an embodiment may include: transmitting information related to transmission of uplink control information to a terminal; and receiving, from the terminal, the uplink control information and demodulation reference signals (DMRSs) for the uplink control information mapped to a plurality of symbols, wherein if frequency hopping is applied to the transmission of the uplink control information, the number of symbols in the first hop is floor(N/2), and the number of symbols in the second hop is ceil(N/2).

In order to solve the above-described problems, a base station according to an embodiment may include: a transceiver configured to transmit and receive signals; and a controller configured to transmit, to a terminal, information related to transmission of uplink control information and receive, from the terminal, the uplink control information and demodulation reference signals (DMRSs) for the uplink control information mapped to a plurality of symbols, wherein if frequency hopping is applied to the transmission of the uplink control information, the number of symbols in the first hop is floor(N/2), and the number of symbols in the second hop is ceil(N/2).

Advantageous Effects of Invention

According to the disclosure, it is possible to provide coverage even when the transmission power of a terminal is insufficient by providing improvement of performance from frequency diversity by applying frequency hopping to a long PUCCH. In addition, it is possible to multiplex multiple terminals in one frequency resource by providing a method of applying spreading code to a long PUCCH, based on the frequency hopping scheme of the long PUCCH.

MODE FOR THE INVENTION

Figure 1:
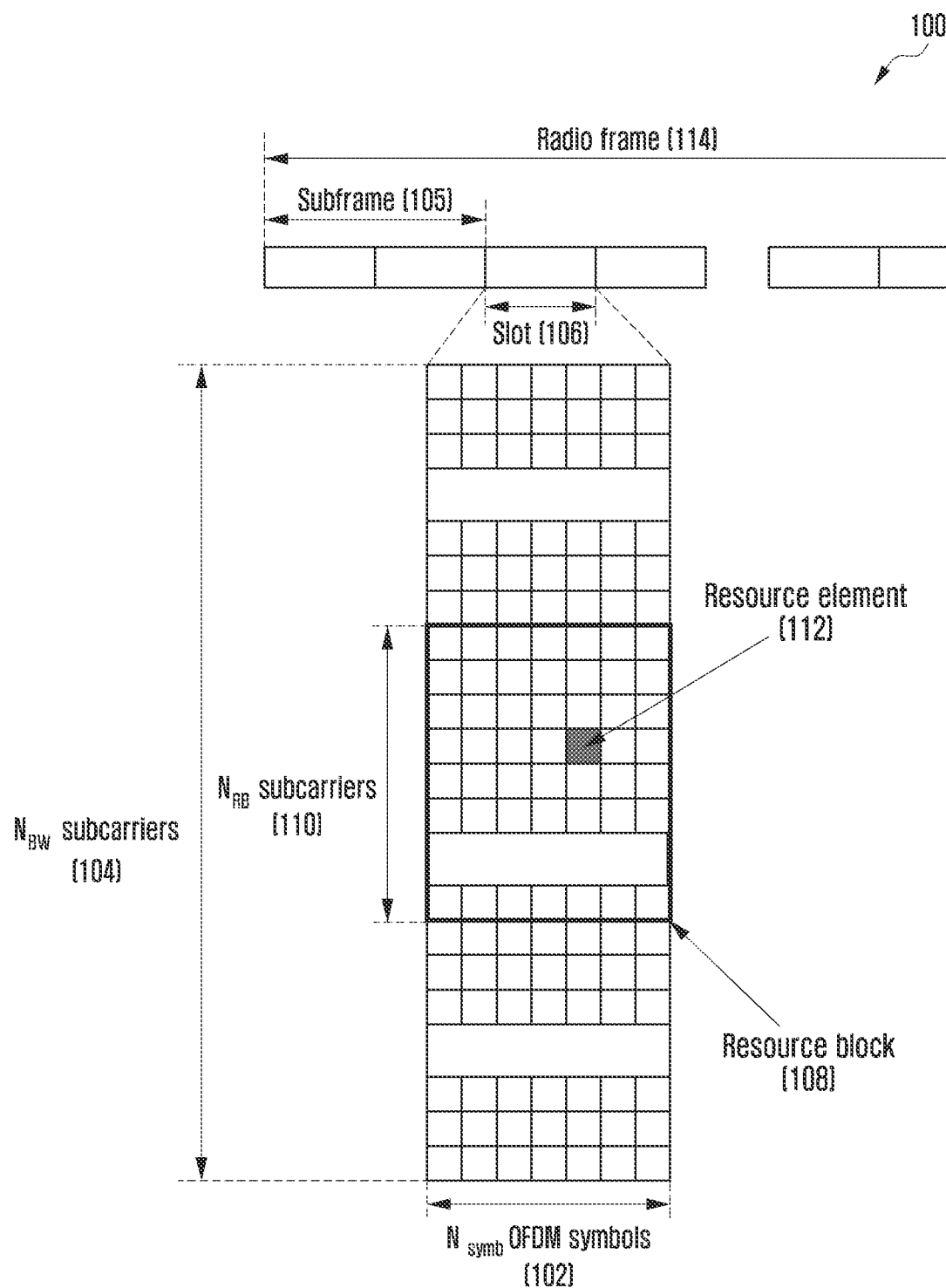
FIG. 1 is a diagram illustrating the fundamental structure of a time-frequency domain in an LTE system.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

Hereinafter, an embodiment of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Further, the detailed description of embodiments of the disclosure is made mainly based on a wireless communication system based on OFDM, particularly 3GPP EUTRA standard, but the subject matter of the disclosure can be applied to other communication systems having a similar technical background and channel form after a little modification without departing from the scope of the disclosure and the above can be determined by those skilled in the art.

In the mobile communication system, research on the technique for supporting coexistence of new 5G communication (or referred to as "NR communication" in the disclosure) and existing LTE communication in the same spectrum is underway.

The disclosure relates to a wireless communication system, and more specifically, to a method in which different wireless communication systems coexist in a single carrier frequency or multiple carrier frequencies and in which a terminal capable of transmitting and receiving data in at least one of the different communication systems transmits and receives data to and from the respective communication systems, and a device therefor.

In general, a mobile communication system has been developed to provide voice services while ensuring the mobility of a user. However, the mobile communication system is gradually expanding to data services, as well as voice services, and at present has been developed to the extent of providing high-speed data services. However, the mobile communication system currently providing services has a shortage of resources, and a more advanced mobile communication system is required in order to meet user demand for higher-speed services.

As one of the next-generation mobile communication systems under development in response to the above demands, standardization of long-term evolution (LTE) is underway in the $3^{rd}$-generation partnership project (3GPP). LTE is technology for implementing high-speed packet-based communications with a transmission rate of up to 100 Mbps. To this end, various methods are under discussion. For example, a method of reducing the number of nodes located on communication paths by simplifying the structure of a network, a method of allowing wireless protocols to approximate wireless channels as closely as possible, and the like have been provided.

The LTE system employs a hybrid automatic repeat reQuest (HARQ) scheme in which a physical layer resends corresponding data in the case of decoding failure upon initial transmission. The HARQ scheme is a technique in which a receiver transmits, to a transmitter, a negative acknowledgment (NACK) indicating decoding failure if the receiver fails to correctly decode the data, thereby enabling the transmitter to retransmit the corresponding data in a physical layer. The receiver combines data retransmitted by the transmitter with the data for which decoding previously failed, thereby improving data reception performance. In addition, if the receiver correctly decodes the data, the receiver may transmit, to the transmitter, an acknowledgment (ACK) indicating success of decoding so that the transmitter may transmit new data.

FIG. 1 is a diagram illustrating the fundamental structure 100 of a time-frequency domain, which is a radio resource domain in which data or a control channel is transmitted in a downlink in an LTE system.

In FIG. 1, the horizontal axis denotes a time domain, and the vertical axis denotes a frequency domain. The minimum transmission unit in the time domain is an OFDM symbol. $N_{symb}$ OFDM symbols 102 constitute one slot 106, and two slots constitute one subframe 105. The slot has a length of 0.5 ms, and the subframe has a length of 1.0 ms. In addition, the radio frame 114 is a time domain unit including 10 subframes. The minimum transmission unit in the frequency domain is the subcarrier, and the entire system transmission bandwidth includes a total of $N_{BW}$ subcarriers 104.

The basic resource unit in the time-frequency domain is a resource element (RE) 112, which may be indicated by an OFDM symbol index and a subcarrier index. A resource block (RB) {or physical resource block (PRB)} 108 is defined by $N_{symb}$ consecutive OFDM symbols 102 in the time domain and $N_{RB}$ consecutive subcarriers 110 in the frequency domain. Thus, one RB 108 includes $N_{symb} \times N_{RB}$ REs 112. In general, the minimum transmission unit of data is the RB unit. In the LTE system, $N_{symb}=7$ and $N_{RB}=12$, and $N_{BW}$ and $N_{RB}$ are proportional to the bandwidth of the system transmission band. The data rate increases in proportion to the number of RBs scheduled to the terminal. Six transmission bandwidths are defined to be operated in the LTE system. In the case of an FDD system in which a downlink and an uplink are classified according to frequency in which they are to operate, the downlink transmission bandwidth and the uplink transmission bandwidth may be different from each other. A channel bandwidth refers to an RF bandwidth corresponding to the system transmission bandwidth. Table 1 below shows the relationship between the system transmission bandwidth and the channel bandwidth defined to correspond to each other in the LTE system. For example, an LTE system with a channel bandwidth of 10 MHz has a transmission bandwidth including 50 RBs.

TABLE 1

| | Channel bandwidth $BW_{channel}$ [MHz] | | | | | |
|---|---|---|---|---|---|---|
| | 1.4 | 3 | 5 | 10 | 15 | 20 |
| Transmission bandwidth configuration | 6 | 15 | 25 | 50 | 75 | 100 |

Downlink control information is transmitted using the first N OFDM symbols in the subframe. In general, N={1, 2, 3}. Therefore, the value N for each subframe varies with the amount of control information to be transmitted in the current subframe. The control information includes a control channel transmission interval indicator indicating the number of OFDM symbols provided for transmission of the control information, scheduling information for downlink data or uplink data, an HARQ ACK/NACK signal, and the like.

In the LTE system, scheduling information for downlink data or uplink data is transmitted from a base station to a terminal through downlink control information (DCI). Uplink (UL) refers to a radio link through which the terminal transmits data or control signals to the base station, and downlink (DL) refers to a radio link through which the base station transmits data or control signals to the terminal. The DCI is defined as various kinds of formats, and a DCI format is applied and operated by determining the same according to the scheduling information for uplink data (UL grant) or the scheduling information for downlink data (DL grant), according to whether or not the control information is a compact DCI having a small size, according to whether or not spatial multiplexing using multiple antennas is applied, or according to whether or not a DCI is intended for power control. For example, DCI format 1, which is the scheduling control information for downlink data (DL grant), is configured to include at least the following control information.

Resource allocation type 0/1 flag: this provides notification of resource allocation type 0 or 1. Type 0 allocates resources by a resource block group (RBG) while applying a bitmap scheme. In the LTE system, the basic unit of scheduling is a resource block (RB) indicated by time and frequency domain resources, and the RBG includes a plurality of RBs and becomes the basic unit of scheduling in type 0. Type 1 allocates a specific RB in the RBG.

Resource block assignment: this provides notification of the RBs allocated for data transmission. The resources to be expressed are determined according to a system bandwidth and a resource allocation scheme.

Modulation and coding scheme (MCS): this provides notification of a modulation scheme used for data transmission and the size of a transport block, which is the data to be transmitted.

HARQ process number: this provides notification of the HARQ process number.

New data indicator: this provides notification of HARQ initial transmission or retransmission.

Redundancy version: this provides notification of a redundancy version of HARQ.

Transmit power control (TPC) command for physical uplink control channel (PUCCH): this provides notification of a transmit power control command for a PUCCH, which is an uplink control channel.

The DCI goes through a channel coding and modulation process, and is then transmitted through a physical downlink control channel (PDCCH) or an enhanced PDCCH (EPDCCH), which is a downlink physical control channel.

In general, the DCI is channel-coded independently for each terminal, and is then configured as an independent PDCCH and transmitted. In the time domain, the PDCCH is mapped and transmitted during the control channel transmission interval. The frequency domain mapping position of the PDCCH is determined by the identifier (ID) of each terminal, and is spread over all system transmission bands.

The downlink data is transmitted through a physical downlink shared channel (PDSCH), which is a physical channel for downlink data transmission. The PDSCH is transmitted after the control channel transmission interval, and provides notification of scheduling information, such as a specific mapping position in the frequency domain, the modulation scheme, and the like, is provided by the DCI transmitted through the PDCCH.

The base station notifies the terminal of the modulation scheme applied to the PDSCH to be transmitted to the terminal and the size of the data {transport block size (TBS)} to be transmitted through the MCS of 5 bits, among the control information constituting the DCI. The TBS corresponds to a size before channel coding for error correction is applied to the data {i.e., transport block (TB)} to be transmitted by the base station.

The modulation schemes supported by the LTE system are quadrature phase shift keying (QPSK), 16-quadrature amplitude modulation (QAM), and 64QAM, and their modulation orders ($Q_m$) correspond to 2, 4, and 6, respectively. That is, 2 bits per symbol can be transmitted in the QPSK modulation; 4 bits per symbol can be transmitted in the 16QAM; and 6 bits per symbol can be transmitted in the 64QAM.

3GPP LTE Rel-10 adopts bandwidth extension technology in order to support a higher data rate than LTE Rel-8. The above technique, called "bandwidth extension" or "carrier aggregation (CA)", may extend a band so as to increase the amount of data transmission to the extent of the extended band, compared to an LTE Rel-8 terminal, which transmits data in a single band. Each of the above bands is referred to as a "component carrier (CC)", and the LTE Rel-8 terminal is defined to have one component carrier for each of the downlink and the uplink. In addition, the downlink component carrier and the uplink component carrier, which is connected thereto through an SIB-2, are bundled and referred to as a "cell". The SIB-2 connection relationship between the downlink component carrier and the uplink component carrier is transmitted through a system signal or an higher layer signal. The terminal supporting the CA may receive downlink data and transmit uplink data through a plurality of serving cells.

If it is difficult for the base station to transmit a physical downlink control channel (PDCCH) to a specific terminal in a specific serving cell in Rel-10, another serving cell may transmit the PDCCH, and may set a carrier indicator field (CIF) indicating that the corresponding PDCCH indicates a physical downlink shared channel (PDSCH) or a physical uplink shared channel (PUSCH) of another serving cell. The CIF may be configured with respect to a terminal supporting the CA. The CIF is determined by adding 3 bits to the PDCCH information in a specific serving cell so as to indicate another serving cell. The CIF is included only when performing cross carrier scheduling, and if the CIF is not included, the cross carrier scheduling is not performed. If the CIF is included in the downlink allocation information (DL assignment), the CIF indicates a serving cell for transmitting a PDSCH scheduled by the DL assignment, and if the CIF is included in the uplink allocation information (UL grant), the CIF is defined to indicate a serving cell in which a PUSCH scheduled by the UL grant is transmitted.

As described above, carrier aggregation (CA), which is a bandwidth extension technique, may be defined so that a plurality of serving cells may be configured with respect to the terminal in LTE Rel-10. In addition, the terminal periodically or aperiodically transmits channel information on the plurality of serving cells to the base station for data scheduling of the base station. The base station schedules data for each carrier and transmits the data, and the terminal transmits A/N feedback on data transmitted for each carrier. LTE Rel-10 was designed such that up to 21 bits of A/N feedback is transmitted and such that if the transmission of the A/N feedback and the transmission of the channel information are simultaneously performed in one subframe, the A/N feedback is transmitted while discarding the channel information. LTE Rel-11 was designed such that channel information of one cell is multiplexed with the A/N feedback so that up to 22 bits of A/N feedback and channel information of one cell are transmitted using PUCCH format 3 in a transmission resource of PUCCH format 3.

LTE Rel-13 assumes a maximum of 32 serving cell configuration scenarios, and thus a technique for extending the number of serving cells up to 32 using unlicensed bands, as well as licensed bands, has been introduced. In addition, considering that the number of licensed bands, such as LTE frequencies, is limited, a technique called "licensed assisted access (LAA)" has been introduced to provide LTE services in unlicensed bands, such as a 5 GHz band. The LAA provides support such that an LTE cell, which is a licensed cell, is operated as a P cell and an LAA cell, which is an unlicensed cell, is operated as an S cell by applying carrier aggregation in the LTE system. Therefore, the feedback produced in the LAA cell as an S cell must be transmitted only in the P cell as in the LTE system, and a downlink subframe and an uplink subframe may be freely applied to the LAA cell. LTE is understood to encompass all technologies evolved from LTE, such as LTE-A and LAA, unless otherwise stated herein.

Meanwhile, since a 5th-generation wireless cellular communication system (hereinafter, referred to as "5G" or "NR" in the specification), which is a communication system subsequent to LTE, must flexibly meet various requirements of users, service providers, and the like, services satisfying various requirements may be supported.

Therefore, 5G may be defined as technology for satisfying requirements selected for respective 5G services, such as enhanced mobile broadband (eMBB) (hereinafter, referred to as "eMBB" in the specification), massive machine-type communication (mMTC) (hereinafter, referred to as "mMTC" in the specification), ultra-reliable and low-latency communication (URLLC) (hereinafter, referred to as "URLLC" in the specification), and the like, from among requirements such as a maximum terminal transmission rate of 20 Gbps, a maximum terminal speed of 500 km/h, a maximum latency time of 0.5 ms, a terminal connection density of 1,000,000 terminals/km$^2$, and the like.

For example, in order to provide eMBB services in 5G, it is required to provide a maximum terminal transmission rate of 20 Gbps in the downlink and a maximum terminal transmission rate of 10 Gbps in the uplink with respect to one base station. In addition, the average transmission speed of the terminal that is actually experienced must be increased. In order to meet the requirements described above, there is a need for improved transmission and reception techniques including a more improved multiple-input multiple-output (MIMO) transmission technique.

In addition, mMTC is being considered to support application services, such as the Internet of Things (IoT), in 5G. The mMTC has requirements, such as support of connection of a large number of terminals in a cell, enhancement of the terminal coverage, improved battery lifetime, and a reduction in the cost of a terminal, in order to effectively provide the Internet of Things. Since the Internet of Things is provided to various sensors and various devices to thus provide a communication function, it must support a large number of terminals (e.g., 1,000,000 terminals/km$^2$) in the cell. In addition, mMTC requires a wider coverage than eMBB because the terminals are likely to be located in shadow areas, such as the basement of a building, an area that is not covered by a cell, or the like, due to the nature of the service. The mMTC requires a very long battery lifetime because it is likely to be configured as a low-cost terminal and, it is difficult to frequently replace the battery of the terminal.

Lastly, the URLLC, which is used for remote control for robots or machines, industrial automation, unmanned aerial vehicles, remote health control, emergency notifications, or the like, must provide cellular-based wireless communication having ultra-low latency and high reliability for specific purposes. For example, the URLLC must satisfy a maximum latency time of less than 0.5 ms, and also has a requirement of providing a packet error rate of $10^{-5}$ or less. Therefore, a transmission time interval (TTI) smaller than that of a 5G service, such as the eMBB, must be provided for the URLLC, and a design for allocating wide resources in a frequency band is also required.

The services considered in the $5^{th}$-generation wireless cellular communication system described above must be provided as a single framework. That is, for efficient resource management and control, it is preferable to integrate the respective services into a single system to thus be controlled and transmitted, instead of operating the respective services independently.

Figure 2:
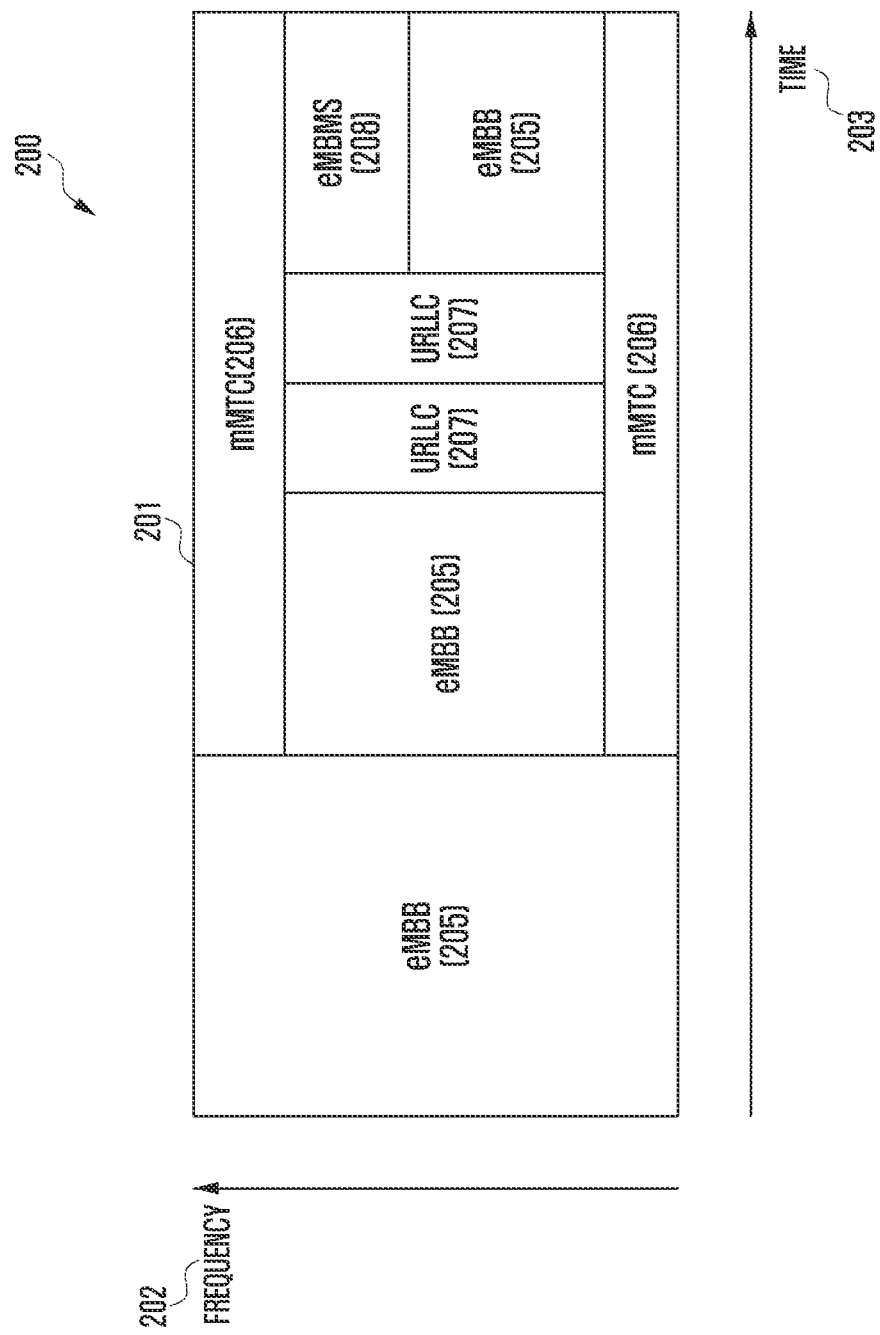
FIG. 2 is a diagram illustrating an example in which 5G services are multiplexed and transmitted in a single system.

FIG. 2 is a diagram illustrating an example 200 in which services considered in 5G are transmitted in a single system.

In FIG. 2, a frequency-time resource 201 used in 5G may be configured as a frequency axis 202 and a time axis 203. FIG. 2 shows an example in which eMBB 205, mMTC 206, and URLLC 207 are operated in a single framework in 5G. In addition, an enhanced mobile broadcast/multicast service (eMBMS) 208 for providing a broadcast service based on a cellular communication may be further considered in 5G. The services considered in 5G, such as eMBB 205, mMTC 206, URLLC 207, eMBMS 208, or the like, may be multiplexed through time-division multiplexing (TDM) or frequency division multiplexing (FDM) within a single system frequency bandwidth operated in 5G, and may then be transmitted. In addition, spatial division multiplexing may be considered. In the case of eMBB 205, it is preferable to occupy a maximum frequency bandwidth for transmission at a specific time in order to provide the increased data rate described above. Therefore, it is preferable that the eMBB 205 service be multiplexed by TDM along with other services within a system transmission bandwidth 201 and then be transmitted, or it is also preferable that the eMBB 205 service be multiplexed by means of FDM with other services within a system transmission bandwidth and then be transmitted according to the needs of other services.

Unlike other services, mMTC 206 requires an increased transmission interval in order to secure wide coverage, and may ensure coverage by repeatedly transmitting the same packet within the transmission interval. In addition, in order to reduce the complexity of a terminal and the terminal price, the transmission bandwidth that the terminal is capable of receiving is limited. In consideration of these requirements, mMTC 206 is preferably multiplexed by means of FDM with other services within the transmission system bandwidth 201 of 5G and is then transmitted.

URLLC 207 preferably has a shorter transmission time interval (TTI) than other services in order to meet the ultra-low latency requirement desired by the service. In addition, since URLLC must have a low coding rate in order to satisfy the requirement of high reliability, it is desirable to have a wide bandwidth on the frequency side. In consideration of the above requirements of URLLC 207, URLLC 207 is preferably multiplexed by means of TDM with other services within the transmission system bandwidth 201 of 5G.

The respective services described above may have different transmission/reception schemes and transmission/reception parameters to satisfy the requirements desired by the services. For example, the respective services may have different numerologies depending on service requirements. In this case, the numerology includes the length of a cyclic prefix (CP), a subcarrier spacing, the length of an OFDM symbol, a transmission time interval (TTI), and the like in a communication system based on orthogonal frequency division multiplexing (OFDM) or orthogonal frequency division multiple access (OFDMA).

As an example of services having different numerologies, eMBMS 208 may have a CP length longer than that of other services. The eMBMS may transmit broadcast-based upper layer traffic, thereby transmitting the same data in all cells. In this case, if signals received in a plurality of cells reach the terminal so as to be delayed within a CP length, the terminal may receive and decode all of the signals, thereby obtaining a single frequency network (SFN) gain. Therefore, a terminal located at a cell boundary may also receive broadcast information without restriction of coverage. However, if the CP length is relatively longer than other services in supporting eMBMS in 5G, waste due to CP overhead is incurred. Therefore, an OFDM symbol length longer than that if other services is required in addition thereto, and a subcarrier interval narrower than that of other services is also required.

In addition, as an example of services having different numerologies in 5G, since URLLC requires a TTI less than other services, a shorter OFDM symbol length may be required, and a wider subcarrier interval may also be required.

Meanwhile, in 5G, one TTI may be defined as one slot, and may include 14 OFDM symbols or 7 OFDM symbols. Therefore, in the case of subcarrier spacing of 15 KHz, one slot has a length of 1 ms or 0.5 ms. In addition, in 5G, one TTI may be defined as one mini-slot or sub-slot for emergency transmission and transmission in an unlicensed band, and one mini-slot may have one OFDM symbol to (total number of OFDM symbols in slot—1) OFDM symbols. For example, if one slot has a length of 14 OFDM symbols, the length of a mini-slot may be determined to be 1 to 13 OFDM symbols. The length of the slot or mini-slot may be defined as a standard, or may be transmitted through a higher-layer signal or system information so that the terminal may receive the same. In addition, instead of the mini-slot or the sub-slot, a slot may be determined to be 1 to 14 OFDM symbols, and the length of the slot may be transmitted through a higher-layer signal or system information so that the terminal may receive the same.

The slot or mini-slot may be defined to have any of various transmission formats, and may be classified into the following formats.

DL-only slot or full DL slot: A DL-only slot is configured only for downlink, and supports only downlink transmission.

DL-centric slot: A DL-centric slot is configured for downlink, GP, and uplink, and the number of OFDM symbols in the downlink is greater than the number of OFDM symbols in the uplink.

UL-centric slot: A UL-centric slot is configured for downlink, GP, and uplink, and the number of OFDM symbols in the downlink is less than the number of OFDM symbols in the uplink.

UL-only slot or full UL slot: A UL-only slot is configured only for uplink and supports only uplink transmission.

Although only the slot formats are classified above, the mini-slots may be classified in the same manner. That is, the mini-slots may be classified into a DL-only mini-slot, a DL-centric mini-slot, a UL-centric mini-slot, a UL-only mini-slot, and the like.

In the case where the terminal is configured such that the uplink control channel is to be transmitted in a single slot, a frequency hopping method of a long PUCCH and a method for applying spreading code to support multiplexing of a terminal according to the frequency hopping method are required. The disclosure provides a method in which a configuration for transmitting a long PUCCH for transmission and reception of an uplink control channel in a slot or a mini-slot of the base station and the terminal is transmitted to the terminal and in which the terminal receives the configuration and transmits the uplink control channel in a slot or a mini-slot. In addition, the transmission interval (or a transmission start symbol and a transmission end symbol) of the uplink control channel may differ depending on the format of the slot or mini-slot. Further, it must be considered that an uplink control channel having a short transmission interval to minimize the transmission delay (hereinafter, referred to as a "short PUCCH" in the disclosure) and an uplink control channel having a long transmission interval to obtain a sufficient cell coverage (hereinafter, referred to as a "long PUCCH" in the disclosure) coexist in a slot or in a plurality of slots, and that the uplink control channel is multiplexed in a slot or in a plurality of slots, such as in the case of transmission of an uplink sounding signal {i.e., a sounding reference signal (SRS)}. Accordingly, in the case of performing transmission of a long PUCCH in a slot, a method of applying frequency hopping and spreading code for supporting multiplexing of a terminal according to the frequency hopping, thereby transmitting the long PUCCH, is provided.

Hereinafter, preferred embodiments of the disclosure will be described in detail with reference to the accompanying drawings. It should be noted that the same elements are denoted by the same reference numerals in the accompanying drawings. In addition, a detailed description of well-known functions and configurations, which may obscure the subject matter of the disclosure, will be omitted.

Further, the embodiments of the disclosure will be described in detail with reference to LTE and 5G systems. However, it will be understood by those skilled in the art that the primary subject matter of the disclosure can be applied to other communication systems having similar technical backgrounds and channel forms by slightly modifying the disclosure without departing from the scope of the disclosure.

Hereinafter, a 5G system for transmitting and receiving data in the 5G cell will be described.

Figures 3A, 3B, 3C:
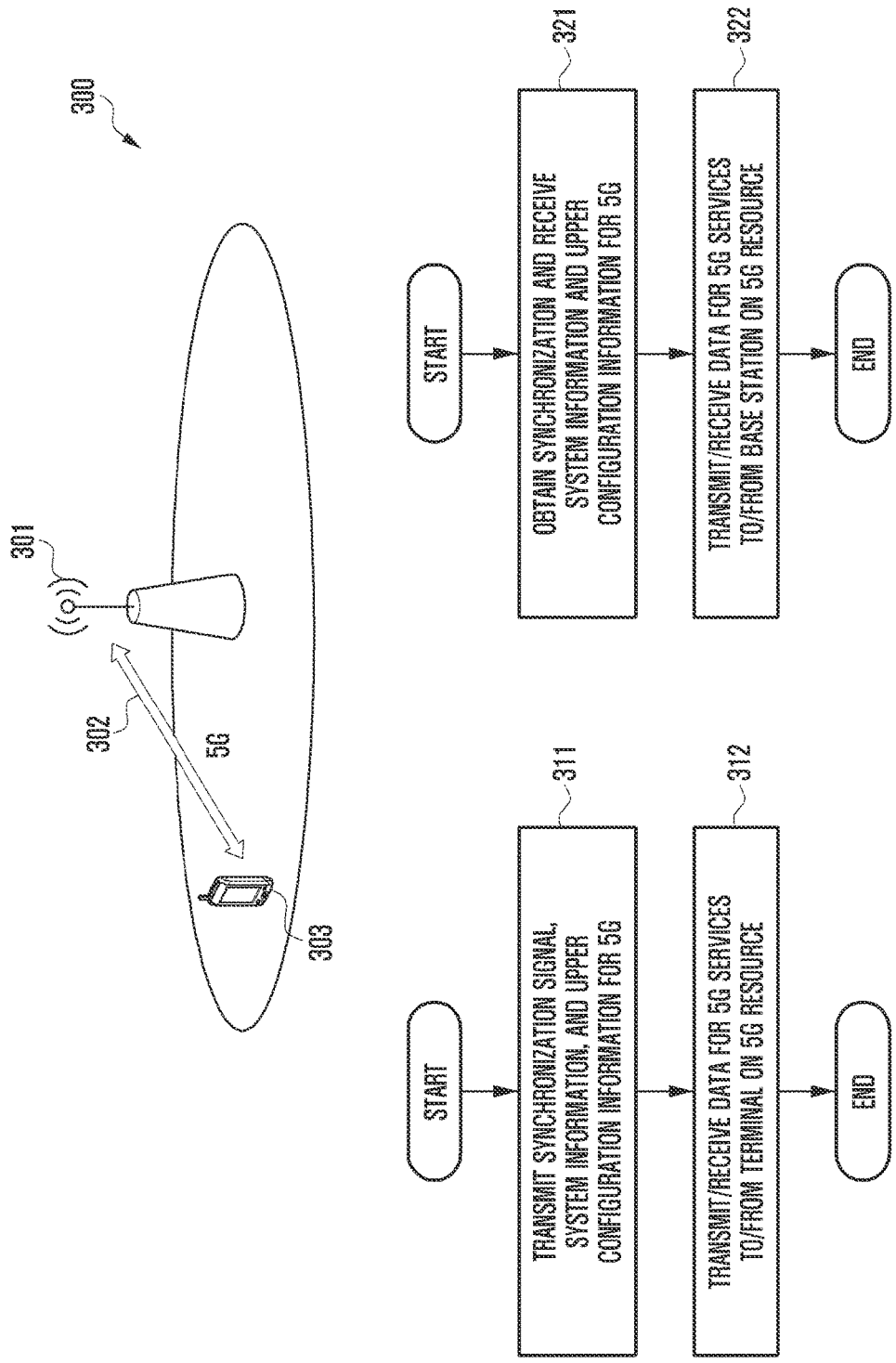
FIGS. 3A to 3C are diagrams illustrating an embodiment of a communication system to which the disclosure is applied.

FIGS. 3A to 3C are diagrams illustrating an embodiment of a communication system 300 to which the disclosure is applied. The diagrams show a structure in which a 5G system is operated, and the methods proposed in the disclosure may be applied to the system in FIGS. 3A to 3C.

FIG. 3A illustrates the case in which a 5G cell 302 is operated in a single base station 301 in a network. A terminal 303 is a 5G-capable terminal having a 5G transceiver module. The terminal 303 obtains synchronization through a synchronization signal transmitted from the 5G cell 302, receives system information, and then transmits/receives data to/from the base station 301 through the 5G cell 302. In this case, there is no limitation as to the duplex scheme of the 5G cell 302. Transmission of an uplink control is performed through the 5G cell 302 in the case where the 5G cell is a P cell. In the system in FIG. 3A, the 5G cell may include a plurality of serving cells, and may support 32 serving cells in total. It is assumed that the base station 301 is equipped with a 5G transmission/reception module (system) in the network, and that the base station 301 is able to manage and operate the 5G system in real time.

Next, a procedure in which the base station 301 configures 5G resources and transmits/receives data to/from the 5G-capable terminal 303 in the resources for 5G will be described with reference to FIG. 3B.

In step 311 in FIG. 3B, the base station 301 transmits, to the 5G-capable terminal 303, a synchronization signal for 5G, system information, and upper configuration information. With regard to the synchronization signal for 5G, separate synchronization signals may be transmitted for eMBB, mMTC, and URLLC using different numerologies, and a common synchronization signal may be transmitted to a specific 5G resource using a single numerology. With regard to the system information, a common system signal may be transmitted to a specific 5G resource using a single numerology, or separate system information may be transmitted for eMBB, mMTC, and URLLC using different numerologies. The system information and the upper configuration information may include configuration information on whether data transmission/reception is to be performed through a slot or a mini-slot, and may include the number of OFDM symbols of a slot or a mini-slot and the numerology thereof. In addition, in the case where downlink common control channel reception is configured with respect to the terminal, the system information and the upper configuration information may include configuration information related to the downlink common control channel reception.

In step 312, the base station 301 transmits/receives data for 5G services to/from the 5G-capable terminal 303 in 5G resources.

Next, a procedure in which the 5G-capable terminal 303 is allocated with 5G resources by the base station 301 and transmits/receives data in the 5G resources will be described with reference to FIG. 3C.

In step 321 in FIG. 3C, the 5G-capable terminal 303 obtains synchronization from the synchronization signal for 5G transmitted from the base station 301, and receives system information and upper configuration information transmitted from the base station 301. With regard to the synchronization signal for 5G, separate synchronization signals may be transmitted for eMBB, mMTC, and URLLC using different numerologies, and a common synchronization signal may be transmitted to a specific 5G resource using a single numerology. With regard to the system information, a common system signal may be transmitted to a specific 5G resource using a single numerology, and separate system information may be transmitted for eMBB, mMTC, and URLLC using different numerologies. The system information and the upper configuration information may include configuration information on whether data transmission/reception is to be performed through a slot or a mini-slot, and may include the number of OFDM symbols of a slot or a mini-slot and the numerology thereof. In addition, in the case where downlink common control channel reception is configured for the terminal, the system information and the upper configuration information may include configuration information related to the downlink common control channel reception.

In step 322, the 5G-capable terminal 303 transmits/receives data for 5G services to/from the base station 301 in 5G resources.

Next, a method in which a terminal receiving a configuration or indication of transmission of a long PUCCH performs frequency hopping on the long PUCCH in order to obtain improvement of performance from frequency diversity and a method of applying spreading code for multiplexing a plurality of terminals to a long PUCCH, based on the frequency hopping method of the long PUCCH, when an uplink control channel, such as a long PUCCH, a short PUCCH, or an SRS, are mixed in one TTI or one slot in the case where the 5G system in FIG. 3 is operated as a slot or a mini-slot will be described.

Figure 4:
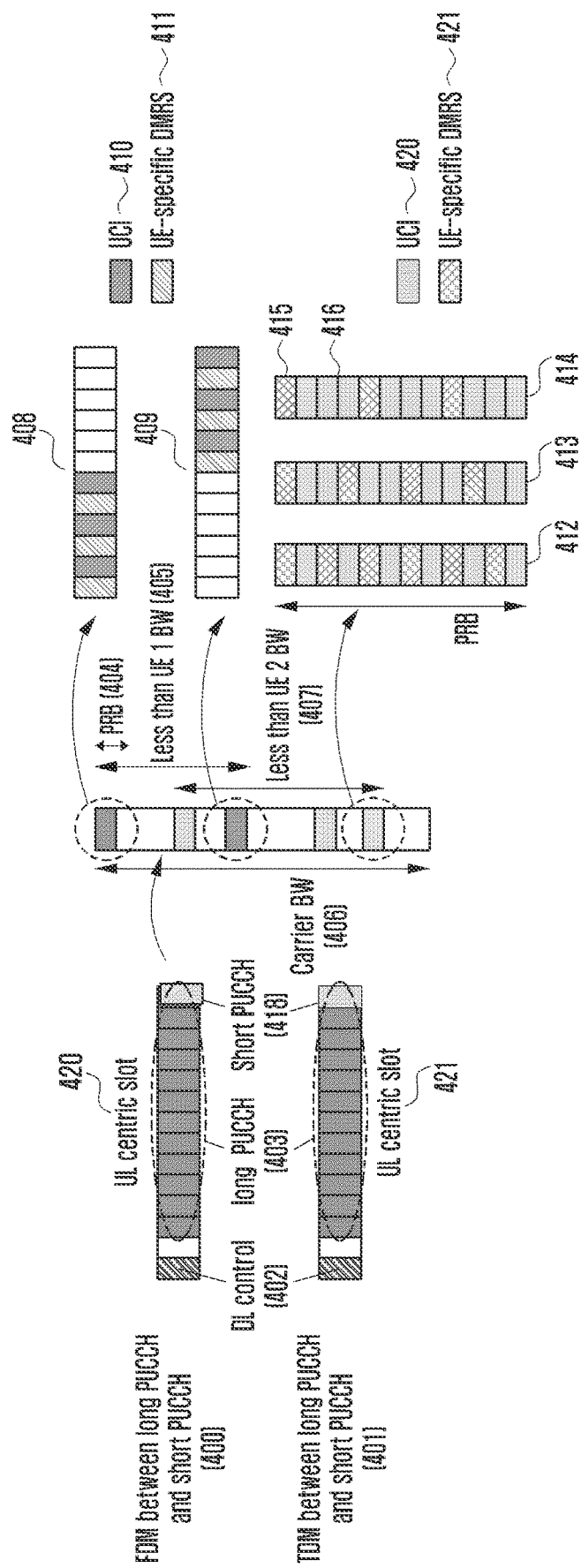
FIG. 4 is a diagram illustrating the structure of an uplink control channel in the disclosure.

FIG. 4 is a diagram showing the structure of an uplink control channel in the disclosure.

Although a method in which a terminal transmits an uplink control channel by determining a transmission interval of a long PUCCH (or a start symbol and an end symbol), based on a slot, will be described in FIG. 4, the method may be applied to the case where a terminal transmits an uplink control channel by determining the transmission interval of a long PUCCH (or a start symbol and an end symbol), based on a mini-slot.

FIG. 4 shows that the long PUCCH and the short PUCCH are multiplexed in the frequency domain (FDM) (400) or multiplexed in the time domain (TDM) (401). First, a slot structure in which the long PUCCH and the short PUCCH are multiplexed in FIG. 4 will be described. Reference numerals 420 and 421 denote UL-centric slots that are used in uplink in a slot as basic transmission units of 5G (the slot may be referred to by various names, such as a "subframe", a "transmission time interval (TTI)", or the like, and the basic transmission unit is referred to as a "slot" in the disclosure). In the UL-centric slot, most OFDM symbols are used for uplink; all OFDM symbols may be used for uplink transmission; or several of the first and last OFDM symbols may be used for downlink transmission. In addition, when downlink and uplink coexist in a slot, there may be a transmission gap therebetween. In FIG. 4, the first OFDM symbol is used for downlink transmission, for example, downlink control channel transmission 402, and the third OFDM symbol and OFDM symbols subsequent thereto are used for uplink transmission in a slot. The second OFDM symbol is utilized as a transmission gap. Uplink data channel transmission and uplink control channel transmission are possible in uplink transmission.

Next, the long PUCCH 403 will be described. Since the control channel of a long transmission interval is used for the purpose of increasing cell coverage, the control channel may be transmitted by a discrete Fourier transform-spread-OFDM (DFT-S-OFDM) scheme, which is a single carrier transmission, instead of the OFDM transmission. Therefore, in this case, the control channel must be transmitted using only consecutive subcarriers, and in order to obtain a frequency diversity effect, an uplink control channel of a long transmission interval is configured to have a distance such as 408 and 409. The distance 405 in frequency must be smaller than the bandwidth supported by the terminal, transmission is performed using PRB-1 at the front of the slot as shown in 408, and transmission is performed using PRB-2 at the back of the slot as shown in 409.

The PRB (physical RB) is a physical resource block, which means a minimum transmission unit on the frequency axis, and may be defined as 12 subcarriers or the like. Therefore, the frequency-sided distance between the PRB-1 and PRB-2 must be less than the maximum support bandwidth of the terminal, and the maximum support bandwidth of the terminal may be less than or equal to the bandwidth 406 supported by the system. Frequency resources PRB-1 and PRB-2 may be configured with respect to the terminal through a higher-layer signal, and a frequency resource may be mapped to a bit field through a higher-layer signal. In addition, the frequency resource to be used may be indicated to the terminal by means of a bit field included in the downlink control channel. In addition, the control channel transmitted at the front of the slot in 408 and the control channel transmitted at the back of the slot in 409 include uplink control information (UCI) 410 and a UE reference signal 411, respectively, and it is assumed that two signals are separated from each other in time and transmitted in different OFDM symbols.

<Additional Description of PUCCH Formats 1, 3, and 4>

The long PUCCH supports transmission formats, such as PUCCH format 1, PUCCH format 3, and PUCCH format 4, according to the number of bits of supportable control information and according to whether multiplexing of a terminal is supported through support for Pre-DFT orthogonal cover code (OCC) at the front of the IFFT. First, PUCCH format 1 is a DFT-S-OFDM-based long PUCCH format capable of supporting up to 2 bits of control information. The control information may include HARQ-ACK, scheduling request (SR), or a combination thereof. PUCCH format 1 includes an OFDM symbol including a DMRS, which is a demodulation reference signal, and an OFDM symbol including uplink control information (UCI), which are repeated. For example, when the number of transmission symbols in PUCCH format 1 is 8, the 8 symbols are configured as a DMRS symbol, a UCI symbol, a DMRS symbol, a UCI symbol, a DMRS symbol, a UCI symbol, a DMRS symbol, and a UCI symbol, from the first start symbol. The DMRS symbol has a structure in which a sequence corresponding to a length of 1 RB on the frequency axis is spread using an orthogonal code on the time axis {or an orthogonal sequence or a spreading code, w_i(m)} in a single OFDM symbol, and is transmitted after performing IFFT. The UCI symbol has a structure in which d(0) is generated through BPSK-modulation for 1-bit control information and QPSK-modulation for 2-bit control information, in which the generated d(0) is scrambled by multiplying the same by a sequence corresponding to a length of 1 RB on the frequency axis, and in which the scrambled sequence is spread using an orthogonal code on the time axis {or an orthogonal sequence or a spreading code, w_i(m)} to then be transmitted after performing IFFT. The terminal generates a sequence, based on group hopping configured by means of a higher-layer signal from the base station or sequence hopping configuration and a configured ID, cyclically shifts the generated sequence using an indicated initial cyclic shift (CS) value, thereby generating a sequence corresponding to the length of 1 RB.

"w_i(m)" is given as follows according to the length ($N_{SF}$) of the spreading code. "i" denotes the index of the spreading code, and "m" denotes the indexes of the elements of the spreading code. Here, the numbers in [ ] in the table indicate φ(m), and for example, in the case where the spreading code has a length of 2, spreading code w_i(m) has values and $w_i(0)=e^{j2\pi*0/N_{SF}}=1$ $w_i(1)=e^{j2\pi*0/N_{SF}}=1$, thereby obtaining w_i(m)=[1 1].

TABLE 2

Spreading code $w_i(m) = e^{j2\pi\varphi(m)/N_{SF}}$ for PUCCH format 1

| $N_{SF}$ | i = 0 | i = 1 | i = 2 | i = 3 | i = 4 | i = 5 | i = 6 |
|---|---|---|---|---|---|---|---|
| | | | φ | | | | |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

Next, PUCCH format 3 is a DFT-S-OFDM-based long PUCCH format capable of supporting 2 bits or more of control information. The control information may include HARQ-ACK, CSI (Channel State Information), SR, or a combination thereof. The positions of DMRS symbols in PUCCH format 3 are shown in Table 3 below according to whether or not frequency hopping is performed and according to whether or not additional DMRS symbols are configured.

TABLE 3

DMRS positions in PUCCH format 3/4 transmission

| | Additional DMRS is configured | | No additional DMRS is configured | |
|---|---|---|---|---|
| PUCCH format 3/4 transmission length | Frequency hopping is not configured | Frequency hopping is configured | Frequency hopping is not configured | Frequency hopping is configured |
| 4 | 1 | 0.2 | 1 | 0.2 |
| 5 | 0, 3 | | 0, 3 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |

TABLE 3-continued

DMRS positions in PUCCH format 3/4 transmission

| PUCCH format 3/4 transmission length | Additional DMRS is configured | | No additional DMRS is configured | |
|---|---|---|---|---|
| | Frequency hopping is not configured | Frequency hopping is configured | Frequency hopping is not configured | Frequency hopping is configured |
| 11 | | 2, 7 | | 1, 3, 6, 9 |
| 12 | | 2, 8 | | 1, 4, 7, 10 |
| 13 | | 2, 9 | | 1, 4, 7, 11 |
| 14 | | 3, 10 | | 1, 5, 8, 12 |

For example, if the number of transmission symbols in PUCCH format 3 is 8, the first symbol of 8 symbols starts with 0, and DMRSs are transmitted in the first symbol and the fifth symbol. The above table is also applied to the DMRS symbol positions in PUCCH format 4.

Next, PUCCH format 4 is a DFT-S-OFDM-based long PUCCH format capable of supporting control information of more than 2 bits. The control information may include HARQ-ACK, channel state information (CSI), SR, or a combination thereof. PUCCH format 4 is different from PUCCH format 3 in that PUCCH format 4 of multiple terminals can be multiplexed in a single RB in the case of PUCCH format 4. It is possible to multiplex PUCCH format 4 of multiple terminals by applying Pre-DFT OCC to control information prior to IFFT. However, the number of control information symbols that can be transmitted in a terminal is reduced according to the number of terminals to be multiplexed.

Next, the short PUCCH 418 will be described. The short PUCCH may be transmitted in both a DL-centric slot and a UL-centric slot. In general, the short PUCCH is transmitted in the last symbol of the slot or in the OFDM symbol at the back of the slot (e.g., the last OFDM symbol, the second to last OFDM symbol, or the last two OFDM symbols). Alternatively, the short PUCCH may be transmitted at any position within the slot. In addition, the short PUCCH may be transmitted using one OFDM symbol, two OFDM symbols, or a plurality of OFDM symbols.

In FIG. 4, the short PUCCH is transmitted in the last symbol 418 of the slot. Radio resources for the short PUCCHs are allocated in units of PRBs on the frequency side. One PRB or a plurality of consecutive PRBs may be allocated, or a plurality of PRBs spaced apart from each other in the frequency bands may be allocated. In addition, the allocated PRBs must be included in a band equal to or smaller than the frequency band 407 supported by the terminal. The plurality of PRBs, which are the allocated frequency resources, may be configured with respect to the terminal through a higher-layer signal. In addition, the frequency resource may be mapped to a bit field by a higher-layer signal, and the frequency resource to be used may be indicated to the terminal by means of a bit field included in the downlink control channel.

Further, the uplink control information 420 and the demodulation reference signal 421 must be multiplexed in a frequency band in a single PRB. There may be a method of transmitting a demodulation reference signal in one subcarrier for every two symbols as shown in 412, a method of transmitting a demodulation reference signal in one subcarrier for every three symbols as shown in 413, or a method of transmitting a demodulation reference signal in one subcarrier for every four symbols as shown in 414. The method to be used, among the methods of transmitting demodulation signals such as 412, 413, and 414, may be configured through a higher-layer signal. Alternatively, one of the mapping schemes is defined in the standard so that the terminal transmits a short PUCCH according to the mapping scheme, and the base station demodulates the short PUCCH according to the mapping scheme. Alternatively, the terminal multiplexes the demodulation reference signal and the uplink control information according to the method indicated through reception of a higher-layer signal and transmits the same. Alternatively, the method of transmitting the demodulation reference signal may be determined according to the number of bits of the uplink control information 420. For example, if the uplink control information has a small number of bits, the terminal may transmit the demodulation reference signal and the uplink control information through multiplexing thereof according to 412.

In the case where the uplink control information has a small number of bits, it is possible to obtain a sufficient transmission code rate even if a large amount of resources is not used for transmission of the uplink control information. For example, if the uplink control information has a large number of bits, the terminal may transmit the demodulation reference signal and the uplink control information through multiplexing thereof according to 414. In the case where the uplink control information has a large number of bits, it is required to use a large amount of resources for transmission of the uplink control information in order to lower the transmission code rate.

<Additional Description of PUCCH Formats 0 and 2>

The short PUCCH supports transmission formats, such as PUCCH format 0 and PUCCH format 2, according to the number of bits of supportable control information. First, PUCCH format 0 is a short PUCCH format based on CP-OFDM (cyclic-prefix-based OFDM) capable of supporting control information of up to 2 bits. The control information may include HARQ-ACK, SR or a combination thereof. PUCCH format 0 has a structure of transmitting only a sequence mapped to 12 subcarriers on the frequency axis in a single OFDM symbol, instead of transmitting the DMRS. The terminal generates a sequence, based on group hopping configured by means of a higher-layer signal from the base station or sequence hopping configuration and a configured ID, and cyclically shifts the generated sequence using a final CS (cyclic shift) value obtained by adding different CS values to an indicated initial CS value according to ACK or NACK, thereby mapping the same to 12 subcarriers to then be transmitted. For example, in the case of talus component 1bit HARQ-ACK, the final CS is generated by adding 6 to the initial CS value for ACK, and the final CS is generated by adding 0 to the initial CS, as shown in the following table. The CS value 0 for NACK and the CS value 6 for ACK are defined in the standard, and the terminal always generates PUCCH format 0 according to the values and transmits 1-bit HARQ-ACK (see Table 4).

TABLE 4

| 1 bit HARQ-ACK | NACK | ACK |
|---|---|---|
| Final CS | (initial CS + 0) mod 12 = initial CS | (initial CS + 6) mod 12 |

For example, in the case of HARQ-ACK of 2 bits, 0 is added to the initial CS value for (NACK, NACK), 3 is added to the initial CS value for (NACK, ACK), 6 is added to the initial CS value for (ACK, ACK), and 9 is added to the initial CS value for (ACK, NACK), as shown in the following table. The CS value 0 for (NACK, NACK), the CS value 3 for (NACK, ACK), the CS value 6 for (ACK, ACK), and the CS value 9 for (ACK, NACK) are defined in the standard, and the terminal always generates PUCCH format 0 according to the above values and transmits a 2-bit HARQ-ACK.

If the final CS value exceeds 12 as a result of the CS value obtained by adding the above values to the initial CS value according to ACK or NACK, it is obvious to apply the modulo 12 thereto because the sequence has a length of 12.

TABLE 5

| 2 bit HARQ-ACK | NACK, NACK | NACK, ACK | ACK, ACK | ACK, NACK |
|---|---|---|---|---|
| Final CS | (initial CS + 0) mod 12 = initial CS | (initial CS + 3) mod 12 | (initial CS + 6) mod 12 | (initial CS + 9) mod 12 |

Next, PUCCH format 2 is a CP-OFDM-based short PUCCH format capable of supporting control information of 2 bits or more. The control information may include HARQ-ACK, CSI, SR, or a combination thereof. In PUCCH format 2, the subcarriers transmitting DMRSs in one OFDM symbol are fixed to the positions of subcarriers having indexes #1, #4, #7, and #10, provided that the first subcarrier has an index #0 as shown in 512. The control information is mapped to the remaining subcarriers, except for the subcarriers in which the DMRSs are located, through a channel encoding and modulation process.

<Method in which Terminal Selects PUCCH Format>

The terminal receives PUCCH resource sets through a higher-layer signal. The terminal selects the configured PUCCH resource sets according to the number of bits of control information. In a specific slot, the terminal selects PUCCH resource set 0 if the number of bits of control information to be transmitted is 1 to 2, selects PUCCH resource set 1 if the number of bits of control information to be transmitted is 3 to $N_2-1$, selects PUCCH resource set 2 if the number of bits of control information to be transmitted is $N_2$ to $N_3-1$, and selects PUCCH resource set 3 if the number of bits of control information to be transmitted is N3 to $N_4-1$. The terminal may receive $N_2$, $N_3$, and $N_4$ in advance from the base station through higher-layer signals. Each PUCCH resource set includes X PUCCH resources, and the X PUCCH resources include resources for short PUCCHs (PUCCH format 0 and PUCCH format 2) or resources for long PUCCHs (PUCCH format 1, PUCCH format 3, and PUCCH format 4). The resource selected by the terminal from among X resources and whether or not a PUCCH format corresponding to the selected resource is to be transmitted, may be indicated through the bits of the downlink control channel, or may be deduced from a transmission resource of the downlink control channel, a slot index, an identifier (ID) of the terminal, or the like. Alternatively, the above may be indicated to the terminal through a combination of indication by means of the downlink control channel and deduction through a transmission resource of the downlink control channel, a slot index, an ID of the terminal, or the like.

The terminal receives or deduces the indication method to thus select one PUCCH resource from the X PUCCH resources and transmit control information through a corresponding PUCCH format. The above PUCCH resource indication method may be applied only when it is possible for the terminal to determine the PUCCH resource through reception of a corresponding downlink control channel before transmission of HARQ-ACK, such as HARQ-ACK transmission. In the case where the terminal does not receive a corresponding downlink control channel before CSI or SR, such as CSI or SR transmission, the terminal receives, from the base station, the PUCCH format to be used in transmission of CSI or SR and a PUCCH resource required therefor in advance through a higher-layer signal, and transmits CSI or SR in the configured PUCCH resource using the configured PUCCH format in the slot for transmission of CSI or SR according to the period and offset set by a higher-layer signal from the base station.

The PUCCH resource corresponding to the PUCCH format includes at least one piece of the following information.

PUCCH transmission start symbol and the number of PUCCH transmission symbols

An index indicating a start PRB, the number of transmission PRBs, whether or not frequency hopping is configured, and the frequency resource of a second hop when frequency hopping is indicated An initial CS value, an index of an orthogonal cover code (OCC) on the time axis, the length of a Pre-DFT OCC, and an index of a Pre-DFT OCC Necessary information and the range of values according to the respective PUCCH formats may be shown in the table below. In Table 6, the case in which a value does not need to be configured or the case in which a range of values is not required because it is 1 are expressed as "N.A.".

TABLE 6

| | | PUCCH Format 0 | PUCCH Format 1 | PUCCH Format 2 | PUCCH Format 3 | PUCCH Format 4 |
|---|---|---|---|---|---|---|
| Starting symbol | Configurability | √ | √ | √ | √ | √ |
| | Value range | 0-13 | 0-10 | 0-13 | 0-10 | 0-10 |
| Number of symbols in a slot | Configurability | √ | √ | √ | √ | √ |
| | Value range | 1, 2 | 4-14 | 1, 2 | 4-14 | 4-14 |
| Index for identifying starting PRB | Configurability | √ | √ | √ | √ | √ |
| | Value range | 0-274 | 0-274 | 0-274 | 0-274 | 0-274 |
| Number of PRBs | Configurability | N.A. | N.A. | √ | √ | N.A. |
| | Value range | N.A. (Default is 1) | N.A. (Default is 1) | 1-16 | 1-6, 8-10, 12, 15, 16 | N.A. (Default is 1) |
| Enabling a FH | Configurability | √ | √ | √ | √ | √ |
| | Value range | On/Off (only for 2 symbol) | On/Off | On/Off (only for 2 symbol) | On/Off | On/Off |
| Freq.cy resource of $2^{nd}$ hop if FH is enabled | Configurability | √ | √ | √ | √ | √ |
| | Value range | 0-274 | 0-274 | 0-274 | 0-274 | 0-274 |
| Index of initial | Configurability | √ | √ | N.A. | N.A. | N.A. |

TABLE 6-continued

|  |  | PUCCH Format 0 | PUCCH Format 1 | PUCCH Format 2 | PUCCH Format 3 | PUCCH Format 4 |
|---|---|---|---|---|---|---|
| cyclic shift | Value range | 0-11 | 0-11 | N.A. | 0-11 | 0-11 |
| Index of time-domain OCC | Configurability | N.A. | √ | N.A. | N.A. | N.A. |
|  | Value range | N.A. | 0-6 | N.A. | N.A. | N.A. |
| Length of Pre-DFT OCC | Configurability | N.A. | N.A. | N.A. | N.A. | √ |
|  | Value range | N.A. | N.A. | N.A. | N.A. | 2, 4 |
| Index of Pre-DFT OCC | Configurability | N.A. | N.A. | N.A. | N.A. | √ |
|  | Value range | N.A. | N.A. | N.A. | N.A. | 0, 1, 2, 3 |

Hereinafter, in the disclosure, the short PUCCH refers to PUCCH format 0 or PUCCH format 2 unless otherwise specified, and the long PUCCH refers to PUCCH format 1, PUCCH format 3, or PUCCH format 4 unless otherwise specified. In addition, in the disclosure, transmission using PUCCH format X refers to transmission using a PUCCH resource for PUCCH format X obtained through the method of the disclosure, which is indicated or deduced from the base station, unless otherwise specified.

Whether a terminal transmits uplink control information using a long PUCCH or a short PUCCH in a slot or a mini-slot may be determined by means of long PUCCH or short PUCCH usage information included in a high-layer signal that is received from the base station. Alternatively, whether a terminal transmits uplink control information using a long PUCCH or a short PUCCH in a slot or a mini-slot may be determined by means of long PUCCH or short PUCCH usage information included in a physical signal that is received from the base station. Alternatively, whether a terminal transmits uplink control information using a long PUCCH or a short PUCCH in a slot or a mini-slot may be implicitly determined by the number of uplink symbols of a slot or a mini-slot. For example, if the number of uplink symbols of a slot or a mini-slot, which is indicated or configured by the base station so as to transmit uplink control information, is 1 or 2, the terminal may transmit uplink control information using a short PUCCH, and if the number of uplink symbols in a slot or a mini-slot is 4 to 14, the terminal may transmit uplink control information using a long PUCCH. Alternatively, whether a terminal transmits uplink control information using a long PUCCH or a short PUCCH in a slot or a mini-slot may be determined in association with information indicating the waveform of msg3 included in msg2 in the process in which the terminal performs random access. That is, if the information indicating the waveform of msg3 included in msg2 is CP-OFDM, the terminal transmits uplink control information through a short PUCCH using a waveform of CP-OFDM.

If the information indicating the waveform of msg3 included in msg2 is DFT-S-OFDM, the terminal transmits uplink control information through a long PUCCH using a waveform of DFT-S-OFDM. Alternatively, the PUCCH format (e.g., PUCCH format 0, PUCCH format 1, PUCCH format 2, PUCCH format 3, or PUCCH format 4) in which a terminal transmits uplink control information in a slot or a mini-slot may be determined by the terminal through individual reception of the following information, determination thereof, or a combination thereof. The first is reception of resource configuration information of the PUCCH format included in a high-layer signal received from the base station; the second is reception of PUCCH format usage indication information included in the physical layer signal by receiving the same, and the third is the number of bits of uplink control information in the slot in which the PUCCH is to be transmitted.

Next, the multiplexing of a long PUCCH and a short PUCCH, which was mentioned above, will be described. In a slot 420, a long PUCCH and a short PUCCH of different terminals may be multiplexed in the frequency domain (400). In this case, the base station may configure frequency resources of the short PUCCHs and the long PUCCHs of different terminals so as not to overlap each other as shown in the PRBs in FIG. 4. However, since configuring different transmission resources of uplink control channels of all terminals, regardless of scheduling, may be waste of frequency, it is not desirable, considering that limited frequency resources must be used for uplink data channel transmission rather than uplink control channel transmission. Therefore, the frequency resources of the short PUCCHs and the long PUCCHs of different terminals may overlap, and the base station must operate such that the scheduling and transmission resources of different terminals do not collide in one slot. However, in the case where it is inevitable for the short PUCCH transmission resource and the long PUCCH transmission resource of different terminals to collide in a specific slot, the base station requires a method for preventing the long PUCCH transmission resource from colliding with the short PUCCH transmission resource, and the terminal is required to adjust the long PUCCH transmission resource according to the indication of the base station. According to the above method, the transmission resources of the short PUCCH and the long PUCCH may be multiplexed in the time domain in one slot 421 (401).

The disclosure provides a method of determining the number of uplink OFDM symbols for transmitting the long PUCCH and the positions of the symbols in consideration of the number of uplink OFDM symbols in a slot format or the number of uplink OFDM symbols in a slot, which differs according to uplink control channel transmission in a short time domain, such as a short PUCCH or an SRS. The disclosure may provide three primary methods.

The first is a method in which the base station directly indicates transmission resources of long PUCCHs in a slot to the terminal using a first signal, and in which the terminal performs transmission of the long PUCCHs in the transmission resources indicated through the reception of the first signal in a slot, or in which the base station implicitly (indirectly) indicates, to the terminal, transmission resources through the definition in the standard that associates the transmission resources of long PUCCHs from the number of uplink/downlink OFDM symbols and the number of GP OFDM symbols in a slot. The first signal may include a higher-layer signal or a physical signal, and the first signal includes an OFDM symbol interval (or a start OFDM symbol and an end OFDM symbol) in the time domain for transmitting a long PUCCH, PRBs in the frequency domain, and the like.

If the terminal receives a third signal indicating that an SRS or a short PUCCH of another terminal is transmitted in a specific OFDM symbol of a slot, and if it is impossible to transmit the long PUCCH having an OFDM symbol interval configured implicitly or by means of the first signal, the terminal may drop the transmission of the long PUCCH. Alternatively, the terminal may determine the number of OFDM symbols for transmitting the long PUCCH, which overlap the OFDM symbols for transmitting the SRS or the short PUCCH, and, if the number of colliding symbols falls within a predetermined threshold range, may transmit the long PUCCH in which the overlapping OFDM symbol is punctured. Otherwise, the terminal may drop the transmission of the long PUCCH. Alternatively, the terminal may always transmit the long PUCCH in which the OFDM symbol overlapping the OFDM symbol for transmission of the SRS or the short PUCCH is punctured. The third signal and the threshold may be configured through a higher-layer signal, and the threshold may be a constant corresponding to a specific number of OFDM symbols.

The second is a method in which the base station directly indicates the transmission resource of a long PUCCH in a slot to the terminal using a first signal and a second signal, and in which the terminal performs transmission of the long PUCCH in the transmission resource indicated through the reception of the first signal in a slot. The first signal may include a higher-layer signal, and the second signal may include a physical signal. The first signal may include an OFDM symbol interval (or a start OFDM symbol and an end OFDM symbol) in the time domain for transmission of the long PUCCH and an available set of PRBs in the frequency domain and the like, and the second signal may select one from the available set for indication.

The third is a method in which the base station directly or indirectly indicates, to the terminal, long PUCCH transmission resources in a slot in advance through a first signal or through the definition in the standard for associating the long PUCCH transmission resources from the number of uplink/downlink OFDM symbols and the number of GP OFDM symbols in a slot, and reduces or adjusts the pre-indicated long PUCCH transmission resources through a second signal in one slot in order to avoid collision with a uplink control channel transmission resource in a short time domain. The terminal predetermines the transmission interval of the long PUCCH by the reception of the first signal or the number of uplink/downlink OFDM symbols and the number of GP OFDM symbols of the slot, and adjusts the long PUCCH transmission resource in one slot through the reception of the second signal, thereby transmitting the long PUCCH in one slot. The first signal and the second signal may include higher-layer signals, physical signals, or a combination thereof. The first signal includes an OFDM symbol interval (or a start OFDM symbol and an end OFDM symbol) in the time domain for transmission of the long PUCCH, PRBs in the frequency domain, and the like, and the second signal includes an OFDM symbol interval (or a start OFDM symbol and an end OFDM symbol) in the time domain incapable of transmitting the long PUCCH in a slot, PRBs in the frequency domain, and the like.

The first method is suitable for uplink control channel transmission, such as periodic channel information transmission, which is configured with respect to the terminal so as to perform periodic transmission without a scheduling grant. The second and third methods are suitable for uplink control channel transmission, such as HARQ-ACK transmission, which is configured with respect to the terminal so as to perform aperiodic transmission according to a scheduling grant. Therefore, the first, second, or third method may be applied depending on whether the uplink control channel transmitted by the terminal is triggered by a scheduling grant or whether the transmitted uplink control channel is periodic channel information or HARQ-ACK.

That is, the terminal may apply the first method to the uplink control channel transmission configured such that the terminal transmits the uplink control channel without a scheduling grant, and the terminal may apply the second or third method to the case in which the uplink control channel transmission by the terminal is triggered by a scheduling grant. Alternatively, the terminal may apply the first method to the uplink control channel for transmitting periodic channel information, and the terminal may apply the second or third method to the uplink control channel for transmitting HARQ-ACK information. Alternatively, the terminal may be indicated about whether the first method is always applied or the second or third method is always applied through a higher-layer signal. If the terminal receives a configuration signal, as a higher-layer signal, indicating that the first method is always applied to the uplink control channel, the terminal always applies the first method to the uplink control channel, thereby transmitting the same, and if the terminal receives a configuration signal, as a higher-layer signal, indicating that the second method is always applied to the uplink control channel, the terminal always applies the second method to the uplink control channel, thereby transmitting the same. If the terminal receives a configuration signal, as a higher-layer signal, indicating that the third method is always applied to the uplink control channel, the terminal always applies the third method to the uplink control channel, thereby transmitting the same.

The first, second, and third methods will be described in detail below.

The first method is to indicate to the terminal an OFDM symbol interval for transmission of a long PUCCH (or a start OFDM symbol and an end OFDM symbol or an OFDM symbol avoiding transmission of a long PUCCH) in the downlink control channel. The downlink control channel may be information common to a group terminal or all terminals in a cell, or may be dedicated information transmitted only to a specific terminal. For example, if the long PUCCH transmission frequency resource of a terminal collides with the short PUCCH transmission frequency resource of another terminal in the last OFDM symbol of a slot, the base station may configure the long PUCCH transmission interval so as to avoid the last OFDM symbol of the slot. For example, if the long PUCCH transmission interval supports 12 OFDM symbols from the $4^{th}$ OFDM symbol (the uplink interval of the UL-centric slot of 1d-20 is the $12^{th}$ OFDM symbol), the base station indicates transmission of long PUCCHs in 11 OFDM symbols, instead of transmission of long PUCCHs in 12 OFDM symbols, using a bit field of a downlink control channel, and the terminal transmits long PUCCHs in 11 OFDM symbols. As another example, if the long PUCCH transmission interval is configured through a higher-layer signal or is defined in the standard as a set including at least one value of a limited symbol interval, for example, if it is configured through a higher-layer signal or is defined in a standard such that transmission is performed only in $4^{th}$, $6^{th}$, $8^{th}$, $10^{th}$, and $12^{th}$ OFDM symbols, the base station indicates transmission of the long PUCCH in the $10^{th}$ OFDM symbol using a bit field of a downlink control channel in order to avoid collision with short PUCCH transmission resources in the last OFDM symbol, and the terminal transmits long PUCCHs in 10 OFDM symbols. Alternatively, it is also possible to indicate an interval for transmission of the short PUCCH (or whether or not it is the last OFDM symbol, whether or not it is the second to last OFDM symbol, or whether or not it is the last two OFDM symbols in a slot) to the terminal, thereby avoiding resource collision with the long PUCCH.

The second method is to configure an OFDM symbol interval for transmission of the long PUCCH (or a start OFDM symbol and an end OFDM symbol, or an OFDM symbol to avoid transmission of the long PUCCH) to the terminal through a higher-layer signal. For example, the short PUCCH transmission frequency resources may be configured so as to have distributed PRBs, or may be configured so as to have localized PRBs. In the case where the short PUCCH transmission frequency resources have distributed PRBs, it is likely to collide with the long PUCCH transmission resources. Thus, the base station may configure the OFDM symbol interval for long PUCCH transmission so as to avoid the OFDM symbols for transmitting the short PUCCH, for example, the last OFDM symbol, through a higher-layer signal. For example, the base station performs configuration with respect to the terminal through a higher-layer signal such that the long PUCCH transmission interval is transmitted in the $10^{th}$ OFDM symbol, and the terminal performs transmission of the long PUCCH in the $10^{th}$ OFDM symbol.

The third method is to configure whether to perform transmission of a long PUCCH or transmission of a short PUCCH to the terminal through a higher-layer signal or a physical downlink control signal, and associates the OFDM symbol interval for transmitting the long PUCCH from the number of uplink OFDM symbols according to the slot format. However, the terminal receives information on whether or not transmission of the long PUCCH can also be performed in the last one or two OFDM symbols. The terminal may receive the configuration information, thereby determining whether to transmit a long PUCCH or a short PUCCH, and in the case where the terminal receives the indication information and performs transmission of a long PUCCH, the terminal determines information on whether or not transmission of a long PUCCH can also be performed in the last one or two OFDM symbols. That is, assuming that the uplink OFDM symbol interval in the slot is the $11^{th}$ OFDM symbol, the terminal determines that the long PUCCH is transmitted in the $11^{th}$ OFDM symbol interval from the uplink OFDM symbol interval of the slot, and receives the indication information, thereby determining whether to transmit the long PUCCH in the $11^{th}$ OFDM symbol, the $10^{th}$ OFDM symbol, or the $9^{th}$ OFDM symbol. If the long PUCCH is transmitted in the $10^{th}$ OFDM symbol or the $9^{th}$ OFDM symbol, the long PUCCH symbols may be punctured from the back or rate-matched, based on the transmission of the long PUCCH in the $11^{th}$ OFDM symbol. The terminal receives information about the uplink OFDM symbol interval of the slot from a downlink control channel, and the downlink control channel may be information common to group terminals or all terminals in a cell, or may be dedicated information transmitted only to a specific terminal.

Figure 5B:
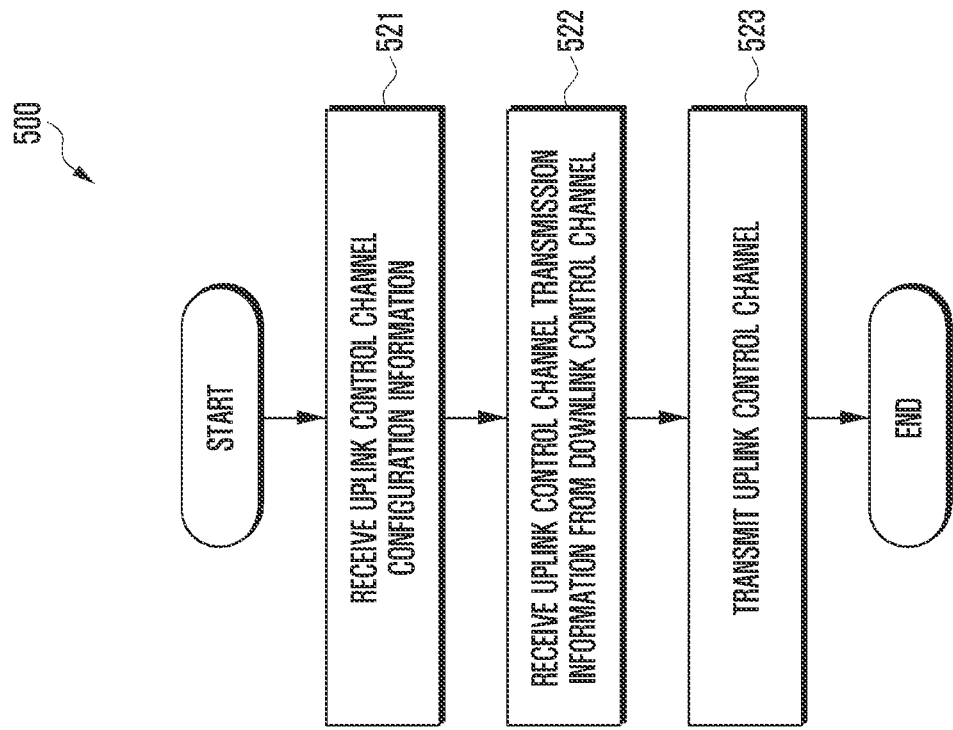
FIGS. 5A and 5B are diagrams illustrating procedures of a base station and a terminal for uplink control channel resources in the disclosure.
Figure 5A:
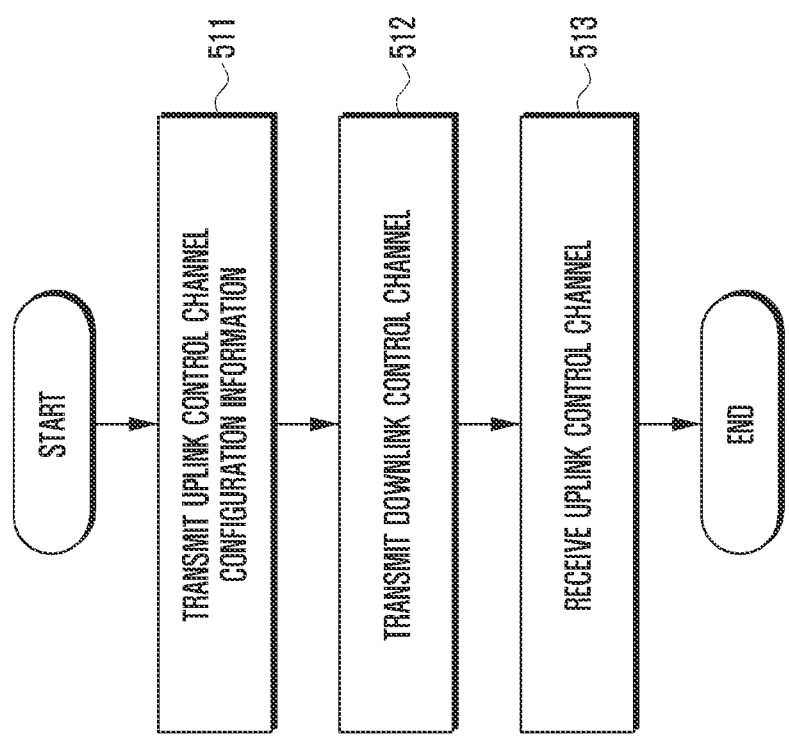

FIGS. 5A and 5B are diagrams illustrating procedures 500 of a base station and a terminal for uplink control channel resources in the disclosure.

First, a procedure of the base station will be described with reference to FIG. 5A.

In step 511, the base station transmits, to a terminal, uplink control channel configuration information. As described with reference to FIG. 4, the uplink control channel configuration information may include an available set including frequency PRB resources of the long PUCCH or short PUCCH or at least one value in the OFDM symbol interval on the time axis, and may be transmitted to the terminal through a higher-layer signal in order to avoid collision of transmission resources of the short PUCCH or the long PUCCH between terminals.

In step 512, the base station transmits a downlink control channel to the terminal. As described with reference to FIG. 4, the downlink control channel may include a bit field indicating frequency PRBs of a short PUCCH or a long PUCCH, an OFDM symbol interval on the time axis, a start OFDM symbol and an end OFDM symbol, or an OFDM symbol to avoid transmission of a long PUCCH, and may be transmitted to the terminal in order to avoid collision of transmission resources of the short PUCCH or the long PUCCH between terminals. The downlink control channel may be information common to group terminals or all terminals in a cell, or may be dedicated information transmitted only to a specific terminal.

In step 513, the base station receives an uplink control channel from the terminal at the short PUCCH or long PUCCH transmission time and the frequency resource indicated in step 511 or 512.

Next, a procedure of the terminal will be described with reference to FIG. 5B.

In step 521, the terminal receives, from the base station, uplink control channel configuration information. As described with reference to FIG. 4, the uplink control channel configuration information may include an available set including frequency PRB resources of the long PUCCH or the short PUCCH or at least one value in the OFDM symbol interval on the time axis, and may be received from the base station through a higher-layer signal in order to avoid collision of transmission resources of the short PUCCH or the long PUCCH between terminals.

In step 522, the terminal receives a downlink control channel from the base station. As described with reference to FIG. 4, the downlink control channel may include a bit field indicating frequency PRBs of a short PUCCH or a long PUCCH, an OFDM symbol interval on the time axis, a start OFDM symbol and an end OFDM symbol, or an OFDM symbol to avoid transmission of a long PUCCH, and may be received in order to avoid collision of transmission resources of the short PUCCH or the long PUCCH between terminals. The downlink control channel may be information common to group terminals or all terminals in a cell, or may be dedicated information transmitted only to a specific terminal.

In step 523, the terminal transmits an uplink control channel to the base station at the short PUCCH or long PUCCH transmission time and the frequency resource indicated in step 521 or 522.

Figure 6:
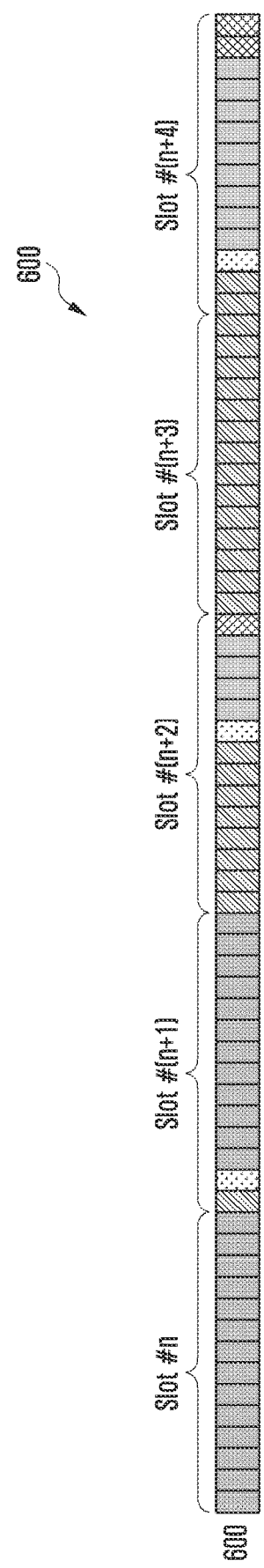
FIG. 6 is a diagram illustrating the structure of a slot format in the disclosure.

FIG. 6 is a diagram illustrating the structure 600 of a slot format in the disclosure.

As described above, 5G supports various slot formats, such as DL-only slots, DL-centric slots, UL-only slots, and UL-centric slots. Each slot format may also include various OFDM symbols in downlink, GP, and uplink. The slot formats and the format structures (the number of OFDM symbols in downlink, GP, and uplink) may be received by a terminal through a higher-layer signal or signal L1.

As shown in FIG. 6, like the slot formats, the slot may have various slot formats. It may be impossible to transmit long PUCCHs, or the number of uplink OFDM symbols capable of transmitting long PUCCHs may differ depending on the slot format or the format structure. For example, referring to 600 in FIG. 6, slot #n is a UL-only slot in which long PUCCHs may be transmitted in 14 OFDM symbols. Slot #(n+1) is a UL-centric slot in which long PUCCHs may be transmitted in 12 OFDM symbols. Slot #(n+2) is a DL-centric slot capable of transmitting long PUCCHs in 5 OFDM symbols, but an SRS transmission resource collides with the long PUCCH transmission resource in the last symbol, so that the long PUCCHs may be transmitted in 4 OFDM symbols. Slot #(n+3) is a DL-only slot that cannot transmit long PUCCHs. Slot #(n+4) is a UL-centric slot capable of transmitting long PUCCHs in 11 OFDM symbols, but short PUCCH transmission resources collide with the long PUCCH transmission resources in the last 2 OFDM symbols, so that the long PUCCHs may be transmitted in 9 OFDM symbols.

Next, a method for applying frequency hopping to the long PUCCH format for transmitting one or two uplink control information bits and applying spreading code when the frequency hopping is applied in the case where a long PUCCH, in particular, PUCCH format 1, is transmitted in various symbols will be described with reference to FIGS. 7 and 8.

First, conditions for applying frequency hopping will be described with reference to FIGS. 7 and 8. Frequency hopping serves to transmit uplink control information and reference signals at different frequencies in order to obtain frequency diversity. In the case where the channel estimation gain obtained by transmitting uplink control information and reference signals at the same frequency is greater than the performance gain obtained from frequency diversity, it is preferable to transmit uplink control information and reference signals at the same frequency. Accordingly, whether or not to apply frequency hopping may be defined in advance in the standard, based on the number of uplink symbols X, and if the number of uplink symbols for transmitting long PUCCHs in a slot is greater than X, the terminal may apply frequency hopping. For example, X may be determined to be 7.

Alternatively, since the short PUCCH is based on CP-OFDM, frequency resources may be configured with respect to a terminal so as to be separated from each other through a higher-layer signal. Accordingly, in case of the short PUCCH, frequency diversity performance may be obtained by configuring frequency resources, instead of frequency hopping. Therefore, whether or not to apply frequency hopping may be predefined in the standard, based on whether or not the PUCCH to be transmitted by the terminal in a slot is a long PUCCH or a short PUCCH, and the frequency hopping may be applied only when the terminal needs to transmit a long PUCCH in a slot.

Alternatively, frequency hopping may be configured using a higher-layer signal, and the terminal receiving the higher-layer signal may determine whether or not to apply frequency hopping when transmitting a long PUCCH. The frequency resources before hopping may be indicated by resource configuration through a higher-layer signal or a physical signal, and the frequency resources after hopping may be determined through a higher-layer signal, a physical signal, or a standard. The terminal may perform the transmission of the long PUCCH at the frequency before the hopping and the frequency after the hopping by receiving the signals or the standard.

Furthermore, the spreading code {w_i(m)} applied in FIGS. 7 and 8 may be a sequence including integers of 1 and −1, or may be a sequence including complex numbers.

Figure 7A:
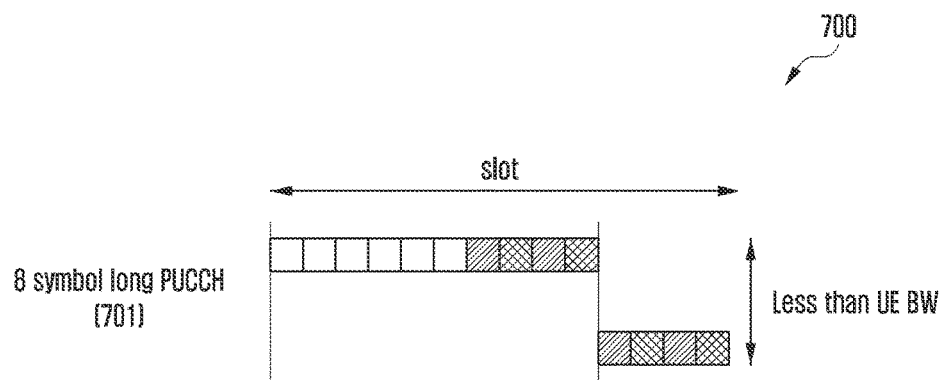
FIGS. 7A to 7C are diagrams illustrating a first embodiment of the disclosure.
Figure 7B:
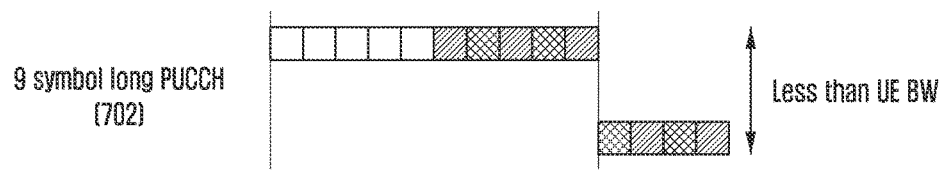
Figure 7C:
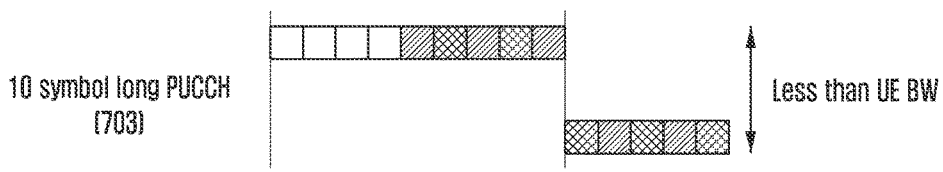

FIGS. 7A to 7C are diagrams illustrating a first embodiment 700 of the disclosure. The first embodiment describes a method of applying frequency hopping by independently determining a symbol for transmitting a reference signal and a symbol for transmitting uplink control information. Although it is described in the embodiment that the long PUCCH transmission symbols are mapped in the order of a symbol for transmitting a reference signal and a symbol for transmitting uplink control information, the disclosure may be applied to an embodiment in which the long PUCCH transmission symbols are mapped in the order of a symbol for transmitting uplink control information and a symbol for transmitting a reference signal.

FIGS. 7A to 7C illustrate an example in which long PUCCHs of various symbols are transmitted in a slot. FIG. 7A shows only 8-symbol long PUCCH 701, FIG. 7B shows only 9-symbol long PUCCH 702, and FIG. 7C shows only 10-symbol long PUCCH 704, but the disclosure may be applied to a long PUCCH having any of various symbol lengths from 4 symbols to 14 symbols.

First, a method of applying frequency hopping and spreading code of the 8-symbol long PUCCH 701 will be described. In the 8-symbol long PUCCH, frequency hopping is applied between the $4^{th}$ symbol and the $5^{th}$ symbol, among the 8 symbols, such that the number of symbols transmitted at a frequency before frequency hopping is equal to the number of symbols transmitted at a frequency after frequency hopping, which is 4. In this case, if the number of symbols used in transmission of long PUCCHs is n, the number of symbols before frequency hopping may be determined to be n/2, and the number of symbols after frequency hopping may be determined to be n/2. In the 4-symbol long PUCCH and the 12-symbol long PUCCH, the number of symbols transmitted at a frequency before frequency hopping and the number of symbols transmitted at a frequency after frequency hopping may be equalized based on the above method.

The long PUCCH symbols at a frequency before frequency hopping in the 8-symbol long PUCCH 701 are configured in the order of a reference signal 711, uplink control information 712, a reference signal 711, and uplink control information 712. In addition, the long PUCCH symbols at a frequency after frequency hopping therein are configured in the order of a reference signal 711, uplink control information 712, a reference signal 711, and uplink control information 712. In this case, spreading code is independently applied to the reference signal symbols and the uplink control information symbols before frequency hopping and is independently applied to the reference signal symbols and the uplink control information symbols after frequency hopping. That is, a spreading code of length 2 is independently applied to the symbols in which two reference signals are transmitted, and a spreading code of length 2 is independently applied to the symbols in which two pieces of uplink control information are transmitted, before frequency hopping. In addition, a spreading code of length 2 is independently applied to the symbols in which two reference signals are transmitted, and a spreading code of length 2 is independently applied to the symbols in which two pieces of uplink control information are transmitted, after frequency hopping.

Since spreading code is independently applied to the symbols in which reference signals are transmitted and the symbols in which uplink control information symbols are transmitted at a frequency before frequency hopping, and the symbols in which reference signals are transmitted and the symbols in which uplink control information symbols are transmitted at a frequency after frequency hopping, the terminal must receive spreading code indexes with respect to the symbols in which reference signals are transmitted and the symbols in which uplink control information is transmitted before frequency hopping, and spreading code indexes with respect to the symbols in which reference signals are transmitted and the symbols in which uplink control information is transmitted after frequency hopping. In order to reduce the payload for transmitting the respective ones of the total of four spreading code indexes, the terminal may receive one spreading code index through a higher-layer signal or a physical signal or define a standard so as to use one spreading code index determined by a slot index or an ID of the terminal, may independently apply the one spreading code to the symbols in which reference signals are transmitted and the symbols in which uplink control information is transmitted before frequency hopping, and may independently apply the one spreading code to the symbols in which reference signals are transmitted and the symbols in which uplink control information is transmitted after frequency hopping, thereby transmitting the same.

Alternatively, respective spreading code indexes determined by assigning a value that differs depending on whether it is before or after frequency hopping may be applied to the symbols before and after frequency hopping. The terminal may apply a first spreading code to the symbols transmitting the reference signal and the symbols transmitting the uplink control information before frequency hopping, respectively, according to the spreading code index determined for the symbols before frequency hopping as described above, and may apply a second spreading code to the symbols transmitting the reference signal and the symbols transmitting the uplink control information after frequency hopping, respectively, according to the spreading code index determined for the symbols after frequency hopping, thereby transmitting the long PUCCHs. In this case, the spreading code index for the symbol after frequency hopping is obtained by comparing the number of symbols transmitting the uplink control information with the number of symbols transmitting the reference signal after frequency hopping and determining the index in the range of available index values of the spreading code corresponding to the same number of symbols or less. If the number of symbols for the uplink control information is 3 and the number of symbols for the reference signal is 2 after frequency hopping, the number of available indexes of the spreading code is determined to be 2 according to the number of symbols for the reference signal. Therefore, the index of the spreading code to be applied to the symbols transmitting the reference signal and the symbols transmitting the uplink control information, respectively, after frequency hopping is determined to be index 0 or index 1.

In order to reduce the payload for transmitting the respective ones of the total of four spreading code indexes, the terminal may receive two spreading code indexes to be applied to the reference signals and the uplink control information, respectively, through a higher-layer signal or a physical signal, assign a slot index or different values according to whether it is before or after frequency hopping, or define a standard so as to use two spreading code indexes determined by an ID of the terminal, may apply the two spreading codes to the symbols in which reference signals are transmitted and the symbols in which uplink control information is transmitted before frequency hopping, respectively, and may independently apply the two spreading codes to the symbols in which reference signals are transmitted and the symbols in which uplink control information is transmitted after frequency hopping, thereby transmitting the same. Alternatively, two spreading code indexes determined by assigning a value that differs depending on whether it is before or after frequency hopping may be applied to the symbols before and after frequency hopping. The terminal may apply a first spreading code to the symbols transmitting the reference signal and apply a second spreading code to the symbols transmitting the uplink control information before frequency hopping according to the spreading code indexes determined for the symbols before frequency hopping as described above, and may apply a third spreading code to the symbols transmitting the reference signal and apply a fourth spreading code to the symbols transmitting the uplink control information after frequency hopping according to the spreading code indexes determined for the symbols after frequency hopping, thereby transmitting the long PUCCHs.

In this case, the spreading code index for the symbols transmitting the reference signal after frequency hopping is determined in the range of available index values of the spreading code corresponding to the number of symbols for the reference signal after frequency hopping. If the number of symbols transmitting the reference signal after frequency hopping is 3, the index of the spreading code to be applied to the symbols transmitting the reference signal after frequency hopping is determined to be index 0, index 1, or index 2. In addition, the spreading code index for the symbols transmitting the uplink control information after frequency hopping is determined in the range of available index values of the spreading code corresponding to the number of symbols for the uplink control information after frequency hopping. If the number of symbols transmitting the uplink control information after frequency hopping is 2, the index of the spreading code to be applied to the symbols transmitting the uplink control information after frequency hopping is determined to be index 0 or index 1.

Second, a method of applying frequency hopping and spreading code of the 9-symbol long PUCCH 702 will be described. In the 9-symbol long PUCCH, frequency hopping is applied between the $5^{th}$ symbol and the $6^{th}$ symbol or between the $4^{th}$ symbol and the $5^{th}$ symbol, among the 9 symbols, such that the number of symbols transmitted at a frequency before the frequency hopping is similar to the number of symbols transmitted at a frequency after the frequency hopping. In this case, if the number of symbols used in transmission of long PUCCHs is n, the number of symbols before frequency hopping may be determined to be ceiling(n/2), and the number of symbols after frequency hopping may be determined to be flooring(n/2). Alternatively, the number of symbols before frequency hopping may be determined to be flooring(n/2), and the number of symbols after frequency hopping may be determined to be ceiling(n/2).

In the 5-symbol long PUCCH, the 7-symbol long PUCCH, the 11-symbol long PUCCH, and the 13-symbol long PUCCH, the number of symbols transmitted at a frequency before frequency hopping and the number of symbols transmitted at a frequency after frequency hopping may be determined based on the above method.

The long PUCCH symbols at a frequency before frequency hopping in the 9-symbol long PUCCH 702 are configured in the order of a reference signal 711, uplink control information 712, a reference signal 711, uplink control information 712, and a reference signal 711. In addition, the long PUCCH symbols at a frequency after frequency hopping therein are configured in the order of uplink control information 712, a reference signal 711, uplink control information 712, and a reference signal 711. In this case, spreading code is independently applied to the reference signal symbols and the uplink control information symbols before frequency hopping and is independently applied to the reference signal symbols and the uplink control information symbols after frequency hopping. That is, a spreading code of length 3 is independently applied to the symbols in which three reference signals are transmitted, and a spreading code of length 2 is independently applied to the symbols in which two pieces of uplink control information are transmitted, before frequency hopping. In addition, a spreading code of length 2 is independently applied to the symbols in which two reference signals are transmitted, and a spreading code of length 2 is independently applied to the symbols in which two pieces of uplink control information are transmitted, after frequency hopping.

Since spreading code is independently applied to the symbols in which reference signals are transmitted and the symbols in which uplink control information symbols are transmitted at a frequency before frequency hopping, and the symbols in which reference signals are transmitted and the symbols in which uplink control information symbols are transmitted at a frequency after frequency hopping, the terminal must receive spreading code indexes with respect to the symbols in which reference signals are transmitted and the symbols in which uplink control information is transmitted before frequency hopping, and spreading code indexes with respect to the symbols in which reference signals are transmitted and the symbols in which uplink control information is transmitted after frequency hopping. In order to reduce the payload for transmitting the respective ones of the total of four spreading code indexes, the terminal may receive one spreading code index through a higher-layer signal or a physical signal or define a standard so as to use a spreading code index determined by a slot index or an ID of the terminal, may independently apply the one spreading code to the symbols in which reference signals are transmitted and the symbols in which uplink control information is transmitted before frequency hopping, and may independently apply the one spreading code to the symbols in which reference signals are transmitted and the symbols in which uplink control information is transmitted after frequency hopping, thereby transmitting the same.

Therefore, the length of the spreading code applied to the symbols in which the reference signal is transmitted before frequency hopping is 3, and the number of spreading codes having a length of 3 is larger than the number of spreading codes having a length of 2. However, a signal is transmitted so as to apply, to the terminal, only a spreading code having a matching index to conform to the length 2 of the spreading code, and the terminal transmits a long PUCCH by applying only the spreading code corresponding to the index included in the signal. Alternatively, respective spreading code indexes determined by assigning a value that differs depending on whether it is before or after frequency hopping may be applied to the symbols before and after frequency hopping. The terminal may apply a first spreading code to the symbols transmitting the reference signal and the symbols transmitting the uplink control information before frequency hopping, respectively, according to the spreading code index determined for the symbols before frequency hopping as described above, and may apply a second spreading code to the symbols transmitting the reference signal and the symbols transmitting the uplink control information after frequency hopping, respectively, according to the spreading code index determined for the symbols after frequency hopping, thereby transmitting the long PUCCHs.

In this case, the spreading code index for the symbol after frequency hopping is obtained by comparing the number of symbols transmitting the uplink control information with the number of symbols transmitting the reference signal after frequency hopping and determining the index in the range of available index values of the spreading code corresponding to the same number of symbols or less. If the number of symbols for the uplink control information is 3 and the number of symbols for the reference signal is 2 after frequency hopping, the number of available indexes of the spreading code is determined to be 2 according to the number of symbols for the reference signal. Therefore, the index of the spreading code to be applied to the symbols transmitting the reference signal and the symbols transmitting the uplink control information, respectively, after frequency hopping is determined to be index 0 or index 1.

In order to reduce the payload for transmitting the respective ones of the total of four spreading code indexes, the terminal may receive two spreading code indexes to be applied to the reference signals and the uplink control information, respectively, through a higher-layer signal or a physical signal, assign a slot index or a value that differs depending on whether it is before or after frequency hopping, or define a standard so as to use two spreading code indexes determined by an ID of the terminal, may apply the two spreading codes to the symbols in which reference signals are transmitted and the symbols in which uplink control information is transmitted before frequency hopping, respectively, and may apply the two spreading codes to the symbols in which reference signals are transmitted and the symbols in which uplink control information is transmitted after frequency hopping, thereby transmitting the same. Alternatively, two spreading code indexes determined by assigning a value that differs depending on whether it is before or after frequency hopping may be applied to the symbols before and after frequency hopping.

The terminal may apply a first spreading code to the symbols transmitting the reference signal and apply a second spreading code to the symbols transmitting the uplink control information before frequency hopping according to the spreading code indexes determined for the symbols before frequency hopping as described above, and may apply a third spreading code to the symbols transmitting the reference signal and apply a fourth spreading code to the symbols transmitting the uplink control information after frequency hopping according to the spreading code indexes determined for the symbols after frequency hopping, thereby transmitting the long PUCCHs. In this case, the spreading code index for the symbols transmitting the reference signal after frequency hopping is determined in the range of available index values of the spreading code corresponding to the number of symbols for the reference signal after frequency hopping.

If the number of symbols transmitting the reference signal after frequency hopping is 3, the index of the spreading code to be applied to the symbols transmitting the reference signal after frequency hopping is determined to be index 0, index 1, or index 2. In addition, the spreading code index for the symbols transmitting the uplink control information after frequency hopping is determined in the range of available index values of the spreading code corresponding to the number of symbols for the uplink control information after frequency hopping. If the number of symbols transmitting the uplink control information after frequency hopping is 2, the index of the spreading code to be applied to the symbols transmitting the uplink control information after frequency hopping is determined to be index 0 or index 1.

Third, a method of applying frequency hopping and spreading code of the 10-symbol long PUCCH 703 will be described. In the 10-symbol long PUCCH, frequency hopping may be applied between the $5^{th}$ symbol and the $6^{th}$ symbol, among the 10 symbols, such that the number of symbols transmitted at a frequency before the frequency hopping is equal to the number of symbols transmitted at a frequency after the frequency hopping. If the number of symbols used in transmission of long PUCCHs is n, the number of symbols before frequency hopping may be determined to be n/2, and the number of symbols after frequency hopping may be determined to be n/2. In the 6-symbol long PUCCH and the 14-symbol long PUCCH, the number of symbols transmitted at a frequency before frequency hopping and the number of symbols transmitted at a frequency after frequency hopping may be equalized based on the above method.

The long PUCCH symbols at a frequency before frequency hopping in the 10-symbol long PUCCH 703 are configured in the order of a reference signal 711, uplink control information 712, a reference signal 711, uplink control information 712, and a reference signal 711. In addition, the long PUCCH symbols at a frequency after frequency hopping therein are configured in the order of uplink control information 712, a reference signal 711, uplink control information 712, a reference signal 711, and uplink control information 712. In this case, spreading code is independently applied to the reference signal symbols and the uplink control information symbols before frequency hopping and is independently applied to the reference signal symbols and the uplink control information symbols after frequency hopping. That is, a spreading code of length 3 is independently applied to the symbols in which three reference signals are transmitted, and a spreading code of length 2 is independently applied to the symbols in which two pieces of uplink control information are transmitted, before frequency hopping. In addition, a spreading code of length 2 is independently applied to the symbols in which two reference signals are transmitted, and a spreading code of length 3 is independently applied to the symbols in which three pieces of uplink control information are transmitted, after frequency hopping.

Since spreading code is independently applied to the symbols in which reference signals are transmitted and the symbols in which uplink control information symbols are transmitted at a frequency before frequency hopping, and the symbols in which reference signals are transmitted and the symbols in which uplink control information symbols are transmitted at a frequency after frequency hopping, the terminal must receive spreading code indexes with respect to the symbols in which reference signals are transmitted and the symbols in which uplink control information is transmitted before frequency hopping, and spreading code indexes with respect to the symbols in which reference signals are transmitted and the symbols in which uplink control information is transmitted after frequency hopping.

In order to reduce the payload for transmitting the respective ones of the total of four spreading code indexes, the terminal may receive one spreading code index through a higher-layer signal or a physical signal or define a standard so as to use one spreading code index determined by a slot index or an ID of the terminal, may independently apply the one spreading code to the symbols in which reference signals are transmitted and the symbols in which uplink control information is transmitted before frequency hopping, and may independently apply the one spreading code to the symbols in which reference signals are transmitted and the symbols in which uplink control information is transmitted after frequency hopping, thereby transmitting the same. Therefore, the length of the spreading code applied to the symbols in which the reference signal is transmitted before frequency hopping or the symbols in which the uplink control information is transmitted after frequency hopping is 3, and the number of spreading codes having a length of 3 is larger than the number of spreading codes having a length of 2. However, a signal is transmitted so as to apply, to the terminal, only a spreading code having a matching index to conform to the length 2 of the spreading code, and the terminal transmits a long PUCCH by applying only the spreading code of the index included in the signal.

Alternatively, respective spreading code indexes determined by assigning a value that differs depending on whether it is before or after frequency hopping may be applied to the symbols before and after frequency hopping. The terminal may apply a first spreading code to the symbols transmitting the reference signal and the symbols transmitting the uplink control information before frequency hopping, respectively, according to the spreading code index determined for the symbols before frequency hopping, and may apply a second spreading code to the symbols transmitting the reference signal and the symbols transmitting the uplink control information after frequency hopping, respectively, according to the spreading code index determined for the symbols after frequency hopping, as described above, thereby transmitting the long PUCCHs. In this case, the spreading code index for the symbol after frequency hopping is obtained by comparing the number of symbols transmitting the uplink control information with the number of symbols transmitting the reference signal after frequency hopping and determining the index in the range of available index values of the spreading code corresponding to the same number of symbols or less. If the number of symbols for the uplink control information is 3 and the number of symbols for the reference signal is 2 after frequency hopping, the number of available indexes of the spreading code is determined to be 2 according to the number of symbols for the reference signal. Therefore, the index of the spreading code to be applied to the symbols transmitting the reference signal and the symbols transmitting the uplink control information, respectively, after frequency hopping is determined to be index 0 or index 1.

In order to reduce the payload for transmitting the respective ones of the total of four spreading code indexes, the terminal may receive two spreading code indexes to be applied to the reference signals and the uplink control information, respectively, through a higher-layer signal or a physical signal, assign a slot index or a value that differs depending on whether it is before or after frequency hopping, or define a standard so as to use two spreading code indexes determined by an ID of the terminal, may apply the two spreading codes to the symbols in which reference signals are transmitted and the symbols in which uplink control information is transmitted before frequency hopping, respectively, and may apply the two spreading codes to the symbols in which reference signals are transmitted and the symbols in which uplink control information is transmitted after frequency hopping, respectively, thereby transmitting the same.

Alternatively, two spreading code indexes determined by assigning a value that differs depending on whether it is before or after frequency hopping may be applied to the symbols before and after frequency hopping. The terminal may apply a first spreading code to the symbols transmitting the reference signal and apply a second spreading code to the symbols transmitting the uplink control information before frequency hopping according to the spreading code indexes determined for the symbols before frequency hopping as described above, and may apply a third spreading code to the symbols transmitting the reference signal and apply a fourth spreading code to the symbols transmitting the uplink control information after frequency hopping according to the spreading code indexes determined for the symbols after frequency hopping, thereby transmitting the long PUCCHs. In this case, the spreading code index for the symbols transmitting the reference signal after frequency hopping is determined in the range of available index values of the spreading code corresponding to the number of symbols for the reference signal after frequency hopping. If the number of symbols transmitting the reference signal after frequency hopping is 3, the index of the spreading code to be applied to the symbols transmitting the reference signal after frequency hopping is determined to be index 0, index 1, or index 2. In addition, the spreading code index for the symbols transmitting the uplink control information after frequency hopping is determined in the range of available index values of the spreading code corresponding to the number of symbols for the uplink control information after frequency hopping. If the number of symbols transmitting the uplink control information after frequency hopping is 2, the index of the spreading code to be applied to the symbols transmitting the uplink control information after frequency hopping is determined to be index 0 or index 1.

Figure 8A:
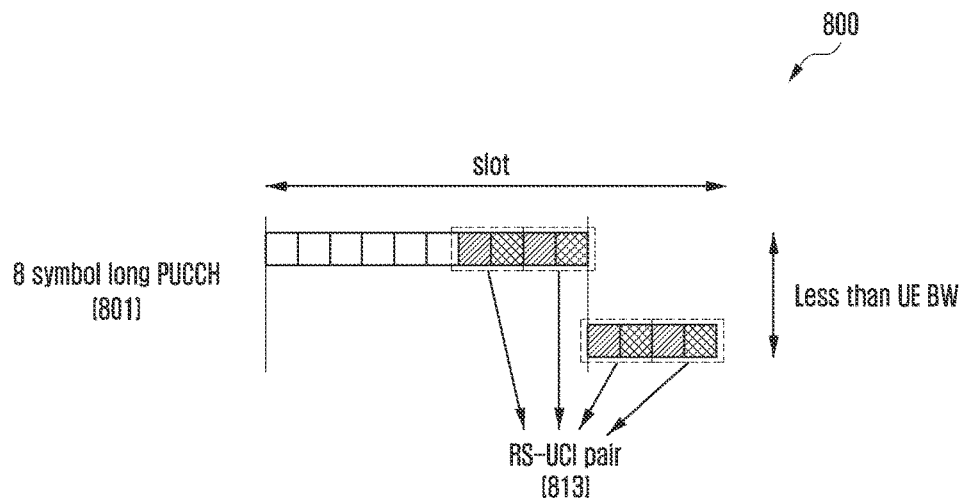
FIGS. 8A to 8C are diagrams illustrating a second embodiment of the disclosure.
Figure 8B:
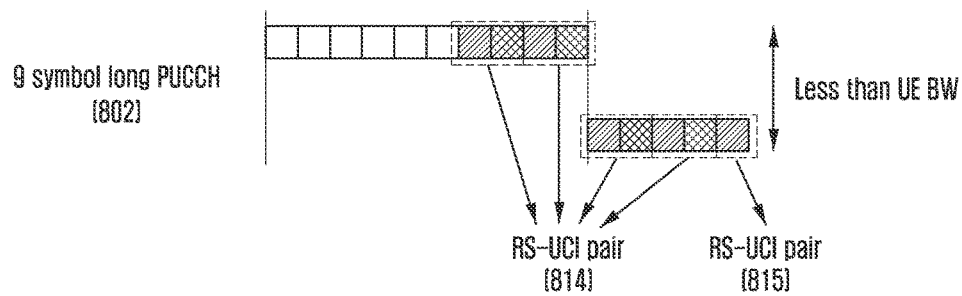
Figure 8C:
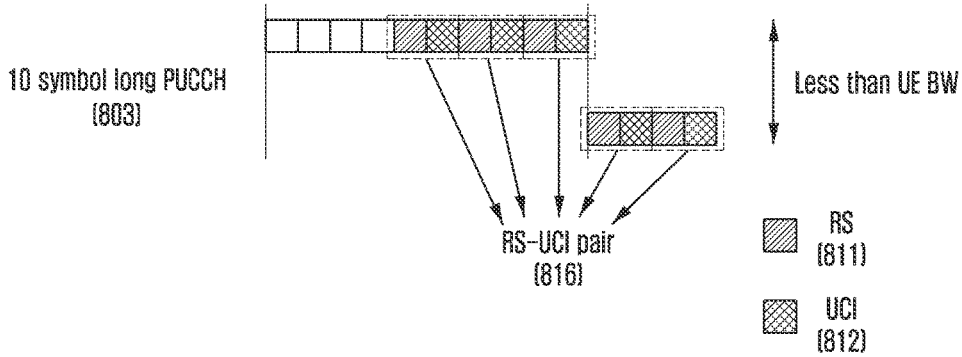

FIGS. 8A to 8C are diagrams illustrating a second embodiment 800 of the disclosure. The second embodiment describes a method of applying frequency hopping by grouping one symbol for transmitting a reference signal and another symbol for transmitting uplink control information next thereto as a RS-UCI pair (reference signal-uplink control information pair). In the following description, although only an RS-UCI pair in which long PUCCH transmission symbols are grouped in the order of RS and UCI will be described, the disclosure may also be applied to a UCI-RS pair in which the long PUCCH symbols are grouped in the order of UCI and RS.

FIGS. 8A to 8C illustrate that long PUCCHs of various symbols are transmitted in a slot. FIG. 8A shows only 8-symbol long PUCCH 801, FIG. 8B shows only 9-symbol long PUCCH 802, and FIG. 8C shows only 10-symbol long PUCCH 803, but the disclosure may be applied to a long PUCCH having any of various symbol lengths from 4 symbols to 14 symbols.

First, a method of applying frequency hopping and spreading code of the 8-symbol long PUCCH 801 will be described. In the 8-symbol long PUCCH, frequency hopping is applied between the $2^{nd}$ RS-UCI pair and the $3^{rd}$ RS-UCI pair such that the number of RS-UCI pairs transmitted at a frequency before frequency hopping is equal to the number of RS-UCI pairs transmitted at a frequency after frequency hopping, which is 2. In this case, if the number of symbols used in transmission of long PUCCHs is n, and if the number of RS-UCI pairs is n/2, the number of RS-UCI pairs before frequency hopping may be determined to be n/4, and the number of RS-UCI pairs after frequency hopping may be determined to be n/4. In the 4-symbol long PUCCH and the 12-symbol long PUCCH, the number of RS-UCI pairs transmitted at a frequency before frequency hopping and the number of RS-UCI pairs transmitted at a frequency after frequency hopping may be equalized based on the above method.

The long PUCCH symbols at a frequency before frequency hopping in the 8-symbol long PUCCH 801 are configured in the order of an RS-UCI pair 813 and an RS-UCI pair 813. In addition, the long PUCCH symbols at a frequency after frequency hopping therein are configured in the order of an RS-UCI pair 813 and an RS-UCI pair 813. In this case, spreading code is independently applied to the reference signal symbols and the uplink control information symbols before frequency hopping and is independently applied to the reference signal symbols and the uplink control information symbols after frequency hopping. That is, a spreading code of length 2 is independently applied to the symbols in which two reference signals are transmitted, and a spreading code of length 2 is independently applied to the symbols in which two pieces of uplink control information are transmitted, before frequency hopping. That is, a spreading code of length 2 is independently applied to the symbols in which two reference signals are transmitted, and a spreading code of length 2 is independently applied to the symbols in which two pieces of uplink control information are transmitted, before frequency hopping. In addition, a spreading code of length 2 is independently applied to the symbols in which two reference signals are transmitted, and a spreading code of length 2 is independently applied to the symbols in which two pieces of uplink control information are transmitted, after frequency hopping.

Since spreading code is independently applied to the symbols in which reference signals are transmitted and the symbols in which uplink control information symbols are transmitted at a frequency before frequency hopping, and the symbols in which reference signals are transmitted and the symbols in which uplink control information symbols are transmitted at a frequency after frequency hopping, the terminal must receive spreading code indexes with respect to the RS-UCI pairs in which reference signals are transmitted and the RS-UCI pairs in which uplink control information is transmitted before frequency hopping, and spreading code indexes with respect to the RS-UCI pairs in which reference signals are transmitted and the RS-UCI pairs in which uplink control information is transmitted after frequency hopping, respectively. In order to reduce the payload for transmitting the respective ones of the total of four spreading code indexes, the terminal may receive one spreading code index through a higher-layer signal or a physical signal or define a standard so as to use one spreading code index determined by a slot index or an ID of the terminal, may independently apply the one spreading code to the RS-UCI pairs in which reference signals are transmitted and the RS-UCI pairs in which uplink control information is transmitted before frequency hopping, and may independently apply the one spreading code to the RS-UCI pairs in which reference signals are transmitted and the RS-UCI pairs in which uplink control information is transmitted after frequency hopping, thereby transmitting the same.

Alternatively, respective spreading code indexes determined by assigning a value that differs depending on whether it is before or after frequency hopping may be applied to the symbols before and after frequency hopping. The terminal may apply a first spreading code to the symbols transmitting the reference signal and the symbols transmitting the uplink control information before frequency hopping, respectively, according to the spreading code index determined for the symbols before frequency hopping, and may apply a second spreading code to the symbols transmitting the reference signal and the symbols transmitting the uplink control information after frequency hopping, respectively, according to the spreading code index determined for the symbols after frequency hopping, as described above, thereby transmitting the long PUCCHs. In this case, the spreading code index for the symbol after frequency hopping is obtained by comparing the number of symbols transmitting the uplink control information with the number of symbols transmitting the reference signal after frequency hopping and determining the index in the range of available index values of the spreading code corresponding to the same number of symbols or less. If the number of symbols for the uplink control information is 3 and if the number of symbols for the reference signal is 2 after frequency hopping, the number of available indexes of the spreading code is determined to be 2 according to the number of symbols for the reference signal. Therefore, the index of the spreading code to be applied to the symbols transmitting the reference signal and the symbols transmitting the uplink control information, respectively, after frequency hopping is determined to be index 0 or index 1.

In order to reduce the payload for transmitting the respective ones of the total of four spreading code indexes, the terminal may receive two spreading code indexes to be applied to the reference signals and the uplink control information, respectively, through a higher-layer signal or a physical signal, assign a slot index or a value that differs depending on whether it is before or after frequency hopping, or define a standard so as to use two spreading code indexes determined by an ID of the terminal, may apply the two spreading codes to the symbols in which reference signals are transmitted and the symbols in which uplink control information is transmitted before frequency hopping, respectively, and may apply the two spreading codes to the symbols in which reference signals are transmitted and the symbols in which uplink control information is transmitted after frequency hopping, respectively, thereby transmitting the same.

Alternatively, two spreading code indexes determined by assigning a value that differs depending on whether it is before or after frequency hopping may be applied to the symbols before and after frequency hopping. The terminal may apply a first spreading code to the symbols transmitting the reference signal and apply a second spreading code to the symbols transmitting the uplink control information before frequency hopping according to the spreading code indexes determined for the symbols before frequency hopping as described above, and may apply a third spreading code to the symbols transmitting the reference signal and apply a fourth spreading code to the symbols transmitting the uplink control information after frequency hopping according to the spreading code indexes determined for the symbols after frequency hopping, thereby transmitting the long PUCCHs.

In this case, the spreading code index for the symbols transmitting the reference signal after frequency hopping is determined in the range of available index values of the spreading code corresponding to the number of symbols for the reference signal after frequency hopping. If the number of symbols transmitting the reference signal after frequency hopping is 3, the index of the spreading code to be applied to the symbols transmitting the reference signal after frequency hopping is determined to be index 0, index 1, or index 2. In addition, the spreading code index for the symbols transmitting the uplink control information after frequency hopping is determined in the range of available index values of the spreading code corresponding to the number of symbols for the uplink control information after frequency hopping. If the number of symbols transmitting the uplink control information after frequency hopping is 2, the index of the spreading code to be applied to the symbols transmitting the uplink control information after frequency hopping is determined to be index 0 or index 1.

Second, a method of applying frequency hopping and spreading code of the 9-symbol long PUCCH 802 will be described. In the 9-symbol long PUCCH, frequency hopping is applied between the $2^{nd}$ RS-UCI pair and the $3^{rd}$ RS-UCI pair such that the number of RS-UCI pairs transmitted at a frequency before frequency hopping is similar to the number of RS-UCI pairs transmitted at a frequency after frequency hopping. In this case, if the number of symbols used in transmission of long PUCCHs is n, and if the number of RS-UCI pairs is ceiling(n/2), the number of RS-UCI pairs before frequency hopping may be determined to be flooring (n/4), and the number of RS-UCI pairs after frequency hopping may be determined to be ceiling(n/4). In particular, the last RS-UCI pair includes one reference symbol in this example. This is an issue occurring due to transmission of the long PUCCHs in odd symbols, and is intended to improve the decoding performance of uplink control information by providing one more normal RS-UCI pair at the frequency after frequency hopping in the case where there is an RS-UCI pair including one symbol at the frequency after the frequency hopping.

In this case, in the 5-symbol long PUCCH, the 7-symbol long PUCCH, the 11-symbol long PUCCH, and the 13-symbol long PUCCH, the number of RS-UCI pairs transmitted at a frequency before frequency hopping and the number of RS-UCI pairs transmitted at a frequency after frequency hopping may be determined based on the above method.

The long PUCCH symbols at a frequency before frequency hopping in the 9-symbol long PUCCH 802 are configured in the order of an RS-UCI pair 814 and an RS-UCI pair 814. In addition, the long PUCCH symbols at a frequency after frequency hopping therein are configured in the order of an RS-UCI pair 814, an RS-UCI pair 814, and an RS-UCI pair 815 including only symbols in which the reference signals are transmitted. In this case, spreading code is independently applied to the reference signal symbols and the uplink control information symbols before frequency hopping and is independently applied to the reference signal symbols and the uplink control information symbols after frequency hopping. That is, a spreading code of length 3 is independently applied to the symbols in which three reference signals are transmitted, and a spreading code of length 2 is independently applied to the symbols in which two pieces of uplink control information are transmitted, before frequency hopping. In addition, a spreading code of length 2 is independently applied to the symbols in which two reference signals are transmitted, and a spreading code of length 2 is independently applied to the symbols in which two pieces of uplink control information are transmitted, after frequency hopping.

Since spreading code is independently applied to the symbols in which reference signals are transmitted and the symbols in which uplink control information symbols are transmitted at a frequency before frequency hopping, and the symbols in which reference signals are transmitted and the symbols in which uplink control information symbols are transmitted at a frequency after frequency hopping, the terminal must receive spreading code indexes with respect to the RS-UCI pairs in which reference signals are transmitted and the RS-UCI pairs in which uplink control information is transmitted before frequency hopping, and spreading code indexes with respect to the RS-UCI pairs in which reference signals are transmitted and the RS-UCI pairs in which uplink control information is transmitted after frequency hopping.

In order to reduce the payload for transmitting the respective ones of the total of four spreading code indexes, the terminal may receive one spreading code index through a higher-layer signal or a physical signal or define a standard so as to use one spreading code index determined by a slot index or an ID of the terminal, may independently apply the one spreading code to the RS-UCI pairs in which reference signals are transmitted and the RS-UCI pairs in which uplink control information is transmitted before frequency hopping, and may independently apply the one spreading code to the RS-UCI pairs in which reference signals are transmitted and the RS-UCI pairs in which uplink control information is transmitted after frequency hopping, thereby transmitting the same. Therefore, the length of the spreading code applied to the symbols in which the reference signal is transmitted before frequency hopping is 3, and the number of spreading codes having a length of 3 is larger than the number of spreading codes having a length of 2. However, a signal is transmitted so as to apply, to the terminal, only a spreading code having a matching index to conform to the length 2 of the spreading code, and the terminal transmits a long PUCCH by applying only the spreading code corresponding to the index included in the signal.

Alternatively, respective spreading code indexes determined by assigning a value that differs depending on whether it is before or after frequency hopping may be applied to the symbols before and after frequency hopping. The terminal may apply a first spreading code to the symbols transmitting the reference signal and the symbols transmitting the uplink control information before frequency hopping, respectively, according to the spreading code index determined for the symbols before frequency hopping, and may apply a second spreading code to the symbols transmitting the reference signal and the symbols transmitting the uplink control information after frequency hopping, respectively, according to the spreading code index determined for the symbols after frequency hopping, as described above, thereby transmitting the long PUCCHs.

In this case, the spreading code index for the symbol after frequency hopping is obtained by comparing the number of symbols transmitting the uplink control information with the number of symbols transmitting the reference signal after frequency hopping and determining the index in the range of available index values of the spreading code corresponding to the same number of symbols or less. If the number of symbols for the uplink control information is 3 and if the number of symbols for the reference signal is 2 after frequency hopping, the number of available indexes of the spreading code is determined to be 2 according to the number of symbols for the reference signal. Therefore, the index of the spreading code to be applied to the symbols transmitting the reference signal and the symbols transmitting the uplink control information, respectively, after frequency hopping is determined to be index 0 or index 1.

In order to reduce the payload for transmitting the respective ones of the total of four spreading code indexes, the terminal may receive two spreading code indexes to be applied to the reference signals and the uplink control information, respectively, through a higher-layer signal or a physical signal, assign a slot index or a value that differs depending on whether it is before or after frequency hopping, or define a standard so as to use two spreading code indexes determined by an ID of the terminal, may apply the two spreading codes to the symbols in which reference signals are transmitted and the symbols in which uplink control information is transmitted before frequency hopping, respectively, and may apply the two spreading codes to the symbols in which reference signals are transmitted and the symbols in which uplink control information is transmitted after frequency hopping, respectively, thereby transmitting the same.

Alternatively, two spreading code indexes determined by assigning a value that differs depending on whether it is before or after frequency hopping may be applied to the symbols before and after frequency hopping. The terminal may apply a first spreading code to the symbols transmitting the reference signal and apply a second spreading code to the symbols transmitting the uplink control information before frequency hopping according to the spreading code indexes determined for the symbols before frequency hopping as described above, and may apply a third spreading code to the symbols transmitting the reference signal and apply a fourth spreading code to the symbols transmitting the uplink control information after frequency hopping according to the spreading code indexes determined for the symbols after frequency hopping, thereby transmitting the long PUCCHs.

In this case, the spreading code index for the symbols transmitting the reference signal after frequency hopping is determined in the range of available index values of the spreading code corresponding to the number of symbols for the reference signal after frequency hopping. If the number of symbols transmitting the reference signal after frequency hopping is 3, the index of the spreading code to be applied to the symbols transmitting the reference signal after frequency hopping is determined to be index 0, index 1, or index 2. In addition, the spreading code index for the symbols transmitting the uplink control information after frequency hopping is determined in the range of available index values of the spreading code corresponding to the number of symbols for the uplink control information after frequency hopping. If the number of symbols transmitting the uplink control information after frequency hopping is 2, the index of the spreading code to be applied to the symbols transmitting the uplink control information after frequency hopping is determined to be index 0 or index 1.

Third, a method of applying frequency hopping and spreading code of the 10-symbol long PUCCH 803 will be described. In the 10-symbol long PUCCH, frequency hopping is applied between the $3^{rd}$ RS-UCI pair and the $4^{th}$ RS-UCI pair or between the $2^{nd}$ RS-UCI pair and the $3^{rd}$ RS-UCI pair such that the number of RS-UCI pairs transmitted at a frequency before frequency hopping is similar to the number of RS-UCI pairs transmitted at a frequency after frequency hopping. In this case, if the number of symbols used in transmission of long PUCCHs is n, and if the number of RS-UCI pairs is n/2, the number of RS-UCI pairs before frequency hopping may be determined to be ceiling(n/4), and the number of RS-UCI pairs after frequency hopping may be determined to be flooring(n/4). Alternatively, the number of RS-UCI pairs before frequency hopping may be determined to be flooring(n/4), and the number of RS-UCI pairs after frequency hopping may be determined to be ceiling(n/4). In this case, in the 6-symbol long PUCCH and the 14-symbol long PUCCH, the number of RS-UCI pairs transmitted at a frequency before frequency hopping and the number of RS-UCI pairs transmitted at a frequency after frequency hopping may be determined based on the above method.

The long PUCCH symbols at a frequency before frequency hopping in the 10-symbol long PUCCH 803 are configured in the order of an RS-UCI pair 816, an RS-UCI pair 816, and an RS-UCI pair 816. In addition, the long PUCCH symbols at a frequency after frequency hopping therein are configured in the order of an RS-UCI pair 816 and an RS-UCI pair 816. In this case, spreading code is independently applied to the reference signal symbols and the uplink control information symbols before frequency hopping and is independently applied to the reference signal symbols and the uplink control information symbols after frequency hopping. That is, a spreading code of length 3 is independently applied to the symbols in which three reference signals are transmitted, and a spreading code of length 2 is independently applied to the symbols in which two pieces of uplink control information are transmitted, before frequency hopping. In addition, a spreading code of length 2 is independently applied to the symbols in which two reference signals are transmitted, and a spreading code of length 3 is independently applied to the symbols in which three pieces of uplink control information are transmitted, after frequency hopping.

Since spreading code is independently applied to the symbols in which reference signals are transmitted and the symbols in which uplink control information symbols are transmitted at a frequency before frequency hopping, and the symbols in which reference signals are transmitted and the symbols in which uplink control information symbols are transmitted at a frequency after frequency hopping, the terminal must receive spreading code indexes with respect to the RS-UCI pairs in which reference signals are transmitted and the RS-UCI pairs in which uplink control information is transmitted before frequency hopping, and spreading code indexes with respect to the RS-UCI pairs in which reference signals are transmitted and the RS-UCI pairs in which uplink control information is transmitted after frequency hopping.

In order to reduce the payload for transmitting the respective ones of the total of four spreading code indexes, the terminal may receive one spreading code index through a higher-layer signal or a physical signal or define a standard so as to use one spreading code index determined by a slot index or an ID of the terminal, may independently apply the one spreading code to the RS-UCI pairs in which reference signals are transmitted and the RS-UCI pairs in which uplink control information is transmitted before frequency hopping, and may independently apply the one spreading code to the RS-UCI pairs in which reference signals are transmitted and the RS-UCI pairs in which uplink control information is transmitted after frequency hopping, respectively, thereby transmitting the same.

Therefore, since the length of the spreading code applied to the symbols in which the reference signal or the uplink control information is transmitted before frequency hopping is 3 and the length of the spreading code applied to the symbols in which the reference signal or the uplink control information is transmitted after frequency hopping is 2, the number of spreading codes having a length of 3 is larger than the number of spreading codes having a length of 2. However, a signal is transmitted so as to apply, to the terminal, only a spreading code having a matching index to conform to the length 2 of the spreading code, and the terminal transmits a long PUCCH by applying only the spreading code corresponding to the index included in the signal. Alternatively, respective spreading code indexes determined by assigning a value that differs depending on whether it is before or after frequency hopping may be applied to the symbols before and after frequency hopping.

The terminal may apply a first spreading code to the symbols transmitting the reference signal and the symbols transmitting the uplink control information before frequency hopping, respectively, according to the spreading code index determined for the symbols before frequency hopping, and may apply a second spreading code to the symbols transmitting the reference signal and the symbols transmitting the uplink control information after frequency hopping, respectively, according to the spreading code index determined for the symbols after frequency hopping, as described above, thereby transmitting the long PUCCHs. In this case, the spreading code index for the symbol after frequency hopping is obtained by comparing the number of symbols transmitting the uplink control information with the number of symbols transmitting the reference signal after frequency hopping and determining the index in the range of available index values of the spreading code corresponding to the same number of symbols or less. If the number of symbols for the uplink control information is 3 and if the number of symbols for the reference signal is 2 after frequency hopping, the number of available indexes of the spreading code is determined to be 2 according to the number of symbols for the reference signal. Therefore, the index of the spreading code to be applied to the symbols transmitting the reference signal and the symbols transmitting the uplink control information, respectively, after frequency hopping is determined to be index 0 or index 1.

In order to reduce the payload for transmitting the respective ones of the total of four spreading code indexes, the terminal may receive two spreading code indexes to be applied to the reference signals and the uplink control information, respectively, through a higher-layer signal or a physical signal, assign a slot index or a value that differs depending on whether it is before or after frequency hopping, or define a standard so as to use two spreading code indexes determined by an ID of the terminal, may apply the two spreading codes to the symbols in which reference signals are transmitted and the symbols in which uplink control information is transmitted before frequency hopping, respectively, and may apply the two spreading codes to the symbols in which reference signals are transmitted and the symbols in which uplink control information is transmitted after frequency hopping, respectively, thereby transmitting the same.

Alternatively, two spreading code indexes determined by assigning a value that differs depending on whether it is before or after frequency hopping may be applied to the symbols before and after frequency hopping. The terminal may apply a first spreading code to the symbols transmitting the reference signal and apply a second spreading code to the symbols transmitting the uplink control information before frequency hopping according to the spreading code indexes determined for the symbols before frequency hopping as described above, and may apply a third spreading code to the symbols transmitting the reference signal and apply a fourth spreading code to the symbols transmitting the uplink control information after frequency hopping according to the spreading code indexes determined for the symbols after frequency hopping, thereby transmitting the long PUCCHs.

In this case, the spreading code index for the symbols transmitting the reference signal after frequency hopping is determined in the range of available index values of the spreading code corresponding to the number of symbols for the reference signal after frequency hopping. If the number of symbols transmitting the reference signal after frequency hopping is 3, the index of the spreading code to be applied to the symbols transmitting the reference signal after frequency hopping is determined to be index 0, index 1, or index 2. In addition, the spreading code index for the symbols transmitting the uplink control information after frequency hopping is determined in the range of available index values of the spreading code corresponding to the number of symbols for the uplink control information after frequency hopping. If the number of symbols transmitting the uplink control information after frequency hopping is 2, the index of the spreading code to be applied to the symbols transmitting the uplink control information after frequency hopping is determined to be index 0 or index 1.

In another embodiment, in the case where the frequency hopping (FH) configuration in the PUCCH resource is disabled (no hopping in a slot) or enabled (applying hopping to a slot), the length of a spreading code to be applied to the symbols for transmitting uplink control information and the symbols for transmitting a reference signal may be determined according to the number of transmission symbols in PUCCH format 1, as follows. Here, the symbols for transmitting the uplink control information and the symbols for transmitting the reference signal alternate from the transmission start symbol that transmits the reference signal in PUCCH format 1.

Therefore, in the case where frequency hopping is disabled, the length of a spreading code matches the number of alternating symbols for transmitting the uplink control information or the number of alternating symbols for transmitting the reference signal, among all transmission symbols of PUCCH format 1. In the case where frequency hopping is enabled, the length of a spreading code in a first hop before frequency hopping matches the number of alternating symbols for transmitting the uplink control information or the number of alternating symbols for transmitting the reference signal, among the transmission symbols in the first hop, and the length of a spreading code in a second hop after frequency hopping matches the number of alternating symbols for transmitting the uplink control information or the number of alternating symbols for transmitting the reference signal, among the transmission symbols in the second hop (see Tables 7 and 8).

TABLE 7

| | length of spreading code | | |
|---|---|---|---|
| | | hopping in slot is ON | |
| transmission length of PUCCH format 1 | spreading code length to be applied to symbols for transmitting uplink control information in PUCCH format 1, when hopping in slot is OFF | spreading code length to be applied to symbols for transmitting uplink control information before frequency hopping (in first hop) | spreading code length to be applied to symbols for transmitting uplink control information after frequency hopping (in second hop) |
| 4 | 2 | 1 | 1 |
| 5 | 2 | 1 | 1 |
| 6 | 3 | 1 | 2 |
| 7 | 3 | 1 | 2 |
| 8 | 4 | 2 | 2 |
| 9 | 4 | 2 | 2 |
| 10 | 5 | 2 | 3 |
| 11 | 5 | 2 | 3 |
| 12 | 6 | 3 | 3 |
| 13 | 6 | 3 | 3 |
| 14 | 7 | 3 | 4 |

TABLE 8

| | length of spreading code | | |
|---|---|---|---|
| | | hopping in slot is ON | |
| transmission length of PUCCH format 1 | spreading code length to be applied to symbols for transmitting reference signal in PUCCH format 1, when hopping in slot is OFF | spreading code length to be applied to symbols for transmitting reference signal before frequency hopping (in first hop) | spreading code length to be applied to symbols for transmitting reference signal after frequency hopping (in second hop) |
| 4 | 2 | 1 | 1 |
| 5 | 3 | 1 | 2 |
| 6 | 3 | 2 | 1 |
| 7 | 4 | 2 | 2 |
| 8 | 4 | 2 | 2 |
| 9 | 5 | 2 | 3 |
| 10 | 5 | 3 | 2 |
| 11 | 6 | 3 | 3 |
| 12 | 6 | 3 | 3 |
| 13 | 7 | 3 | 4 |
| 14 | 7 | 4 | 3 |

An index i of w_i(m), which is a spreading code to be applied to the symbols transmitting uplink control information, is indicated from a base station through an index of time-domain OCC in the PUCCH resource for PUCCH format 1, and a terminal receiving the index i applies a spreading code corresponding to the index i to the symbols for transmitting uplink control information. In this case, an indication to apply hopping to a slot by enabling FH in a PUCCH resource is transmitted from the base station, and if the terminal receives the indication, the index i is applied to the symbols for transmitting uplink control information in the first hop and the symbols for transmitting uplink control information in the second hop, respectively.

In addition, if the transmission length of PUCCH format 1 is 10 or 11, the length of spreading code in the first hop is 2, so that the available spreading code index is 0 or 1, and the length of spreading code in the second hop is 3, so that the available spreading code index is 0, 1, or 2. Therefore, if the base station indicates that the spreading code index to be applied to the symbols for transmitting uplink control information is 2, there is a problem in that there is no spreading code applicable to the first hop. A first possible solution thereto is to take the modulo of the shortest of the spreading code lengths of the first and second hops. That is, Equation 1 below is defined in the standard.

(Spreading code index to be applied by terminal)=i mod min (spreading code length of first hop, spreading code length of second hop)  [Equation 1]

The terminal determines the index of the spreading code, based on Equation 1. A second possible solution is to limit the indication of the base station on the index of the spreading code to the shortest of the spreading code lengths in the first and second hops. In this case, the terminal does not expect to receive spreading code index 2 to be applied to the symbols transmitting uplink control information, and, even if an available spreading code index is 0, 1, or 2 because the spreading code length in the second hop is 3, expects only spreading code index 0 or 1.

Next, an index i of w_i(m), which is a spreading code to be applied to symbols for transmitting a reference signal, will be described. The disclosure provides two methods for indicating, to the terminal, the spreading code to be applied to the symbols transmitting a reference signal. A first method for the symbols transmitting the reference signal is to also apply the spreading code having the index i to be applied to the symbols for transmitting the uplink control information to the symbols for transmitting the reference signal. Therefore, an indication information about the spreading code index i to be applied to the symbols for transmitting the uplink control information is transmitted to the terminal, and the terminal receiving the information applies the spreading code having the index i to the symbols for transmitting the reference signal, as well as the symbol for transmitting the uplink control information.

In this case, an indication to apply hopping to a slot by enabling FH in a PUCCH resource is transmitted from the base station, and if the terminal receives the indication, the index i is applied to the symbols for transmitting the reference signal in the first hop and the symbols for transmitting the reference signal in the second hop, as well as the symbols for transmitting the uplink control information in the first hop and the symbols for transmitting the uplink control information in the second hop. In the first method for the symbols transmitting the reference signal, if the transmission length of PUCCH format 1 is 7, the length of the spreading code for transmitting an uplink control symbol is 3 when FH is disabled, so that the available spreading code index is 0, 1, or 2, and the length of the spreading code for transmitting the reference signal is 4, so that the available spreading code index is 0, 1, 2, or 3. Therefore, if the base station indicates that the spreading code index to be applied to the symbols for transmitting the uplink control symbol is 3, there is a problem in that there is no spreading code applicable to the uplink control symbol. A first possible solution thereto is to take the modulo of the shortest of the spreading code lengths for the uplink control symbol and the reference signal. That is, Equation 2 below is defined in the standard.

(Spreading code index to be applied by terminal)=$i$ mod min (spreading code length for uplink control symbol, spreading code length for reference signal) [Equation 2]

The terminal determines the index of the spreading code, based on the above Equation. A second possible solution is to limit the indication of the base station about the index of the spreading code to the shortest of the spreading code length for the uplink control symbol and the spreading code length for the reference signal symbol. In this case, the terminal does not expect to receive spreading code index 3 to be applied to the symbols for transmitting uplink control information, and, even if an available spreading code index is 0, 1, 2, or 3 because the spreading code length for the reference signal is 4, expects only an indication of spreading code index 0, 1, or 2.

In the second method for the symbols for transmitting the reference signal, the base station separately configures spreading code index k to be applied to the symbols for transmitting the reference signal through a higher-layer signal, and the terminal receives the higher-layer signal and applies the spreading code index k to the symbols for transmitting the reference signal. In the second method for the symbols for transmitting the reference signal, if the transmission length of PUCCH format 1 is 14, the length of the spreading code in the first hop is 4, so that the available spreading code index is 0, 1, 2, or 3, and the length of the spreading code in the second hop is 3, so that the available spreading code index is 0, 1, or 2. Therefore, if the base station indicates that the spreading code index to be applied to the symbols for transmitting the uplink control symbol is 3, there is a problem in that there is no spreading code applicable to the second hop. The first possible solution thereto is to take the modulo of the shortest of the spreading code lengths in the first hop and the second hop. That is, Equation 3 below is defined in the standard.

(Spreading code index to be applied by terminal)=$i$ mod min (spreading code length in first hop, spreading code length in second hop) [Equation 3]

The terminal determines the spreading code index, based on the above equation. A second possible solution is to limit the indication of the base station about the spreading code index to the shortest of the spreading code lengths in the first hop and the second hop. In this case, the terminal does not expect to receive spreading code index 3 to be applied to the symbols for transmitting uplink control information, and even if an available spreading code index is 0, 1, 2, or 3 because the spreading code length for the reference signal is 4, expects only an indication of spreading code index 0, 1, or 2.

Solutions for the case where the lengths of the spreading codes applied to the symbols for transmitting uplink control information and the symbols for transmitting a reference signal are different or the case where the lengths of the spreading codes applied to the symbols for transmitting uplink control information or a reference signal in the first hop and the second hop are different have been provided through the above examples. Another solution obtained through a combination of the above examples is to compare the spreading code lengths of all uplink control symbols with the spreading code lengths of all reference symbols, which are to be applied in one transmission length of PUCCH format 1 both in the cases where frequency hopping is not applied and in the case where frequency hopping is applied, and take the modulo of the smallest one. That is, Equation 4 below is defined in the standard.

(Spreading code index to be applied by terminal)=$i$ mod min (smallest of spreading code lengths to be applied) [Equation 4]

The terminal determines the spreading code index, based on the above equation.

Second, the terminal compares the spreading code lengths of all uplink control symbols with the spreading code lengths of all reference symbols, expects to receive an index value with respect to only the index of the spreading code having the smallest length, and does not expect to receive a spreading code beyond the index of the spreading code having the smallest length. For example, if the smallest length of the spreading code to be applied is y, the terminal expects to receive an index value only in the range of 0 to (y−1), and does not expect to receive an index value exceeding (y−1).

Figure 9B:
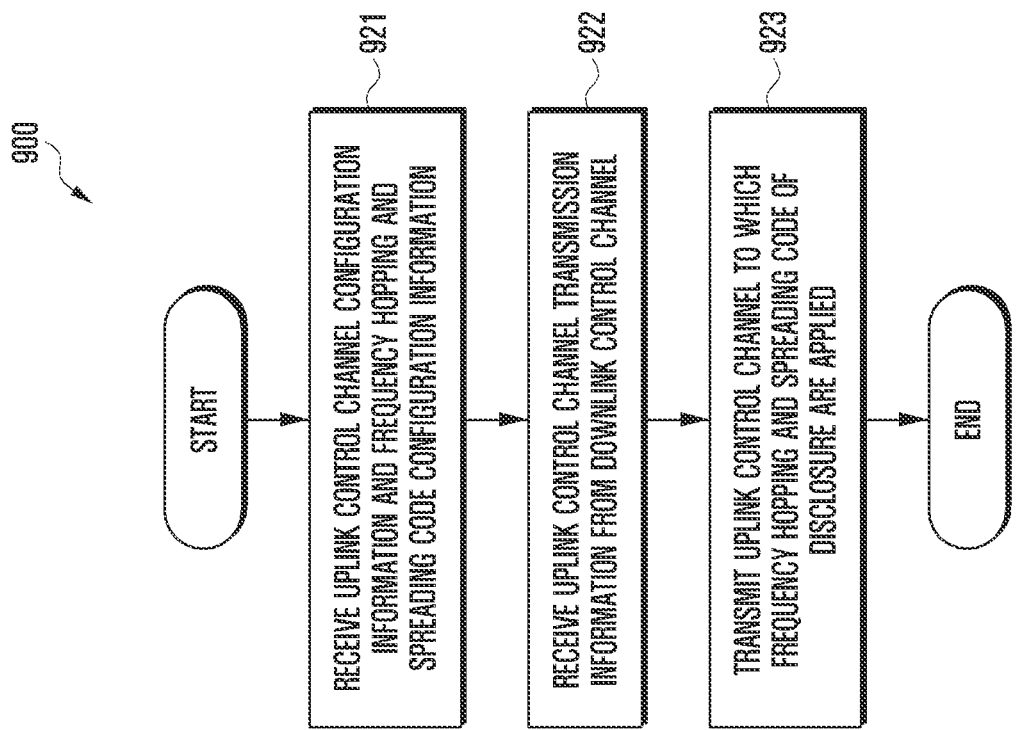
FIGS. 9A and 9B are diagrams illustrating procedures of a base station and a terminal according to embodiments of the disclosure.
Figure 9A:
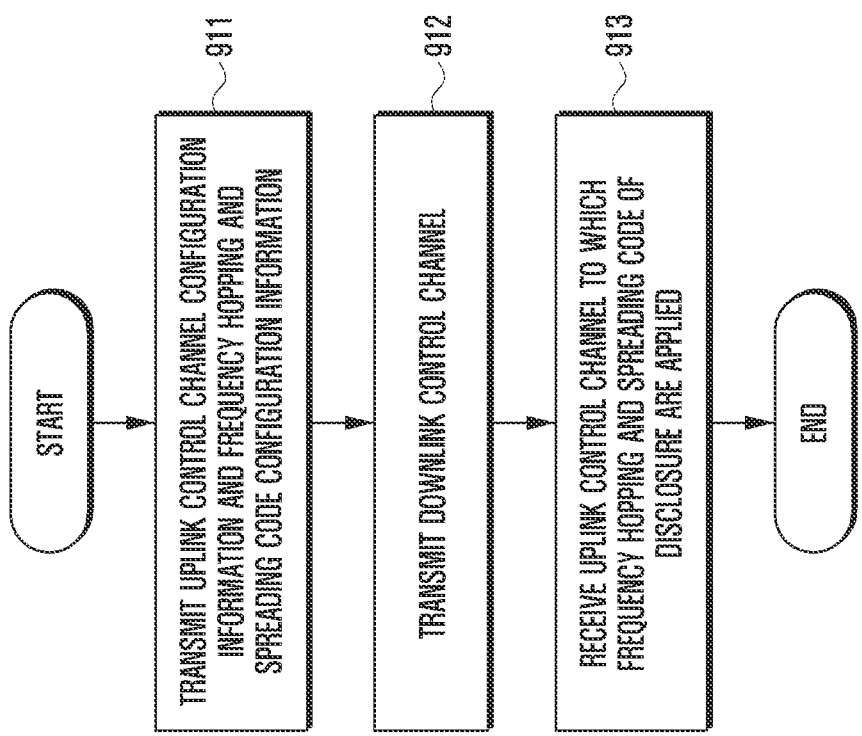

FIGS. 9A and 9B are diagrams illustrating procedures 900 of a base station and a terminal according to embodiments of the disclosure.

First, the procedure of a base station will be described with reference to FIG. 9A.

In step 911, the base station transmits uplink control channel configuration and frequency hopping configuration information to a terminal. As described with reference to FIG. 4, the uplink control channel configuration information may include an available set including frequency PRB resources of a long PUCCH or a short PUCCH or at least one value in the OFDM symbol interval on the time axis, and may be transmitted to the terminal through a higher-layer signal in order to avoid collision of transmission resources of the short PUCCH or the long PUCCH between terminals. In addition, the uplink control channel configuration information may include information indicating whether to transmit the uplink control information using a short PUCCH or a long PUCCH in a slot. The frequency hopping and spreading code configuration information may include configuration information necessary for applying frequency hopping and spreading code of the long PUCCH, as described with reference to FIGS. 7 and 8.

In step 912, the base station transmits a downlink control channel to the terminal. As described with reference to FIG. 4, the downlink control channel may include a bit field indicating frequency PRBs of a short PUCCH or a long PUCCH, an OFDM symbol interval on the time axis, a start OFDM symbol and an end OFDM symbol, or an OFDM symbol to avoid transmission of a long PUCCH, and may be transmitted to the terminal in order to avoid collision of transmission resources of the short PUCCH or the long PUCCH between terminals. In addition, the downlink control channel may include information indicating whether to transmit the uplink control information using a short PUCCH or a long PUCCH in a slot. In addition, the downlink control channel may include information indicating the index of the spreading code to be applied to the long PUCCH. The downlink control channel may be information common to a group terminal or all terminals in a cell, or may be dedicated information transmitted only to a specific terminal.

In step 913, the base station receives, from the terminal, an uplink control channel to which frequency hopping and spreading code have been applied at the short PUCCH or long PUCCH transmission time and in the frequency resource, which are indicated in step 911 or step 912.

Next, the procedure of a terminal will be described with reference to FIG. 9B.

In step 921, the terminal receives uplink control channel configuration information from a base station. As described with reference to FIG. 4, the uplink control channel configuration information may include an available set including frequency PRB resources of a long PUCCH or a short PUCCH or at least one value in the OFDM symbol interval on the time axis, and may be received from the base station through a higher-layer signal in order to avoid collision of transmission resources of the short PUCCH or the long PUCCH between terminals. In addition, the uplink control channel configuration information may include information indicating whether to transmit the uplink control information using a short PUCCH or a long PUCCH in a slot. The frequency hopping and spreading code configuration information may include configuration information necessary for applying frequency hopping and spreading code of the long PUCCH, as described with reference to FIGS. 7 and 8.

In step 922, the terminal receives a downlink control channel from the base station. As described with reference to FIG. 4, the downlink control channel may include a bit field indicating frequency PRBs of a short PUCCH or a long PUCCH, an OFDM symbol time interval, a start OFDM symbol and an end OFDM symbol, or an OFDM symbol to avoid transmission of a long PUCCH, and may be received in order to avoid collision of transmission resources of the short PUCCH or the long PUCCH between terminals. In addition, the downlink control channel may include information indicating whether to transmit the uplink control information using a short PUCCH or a long PUCCH in a slot. In addition, the downlink control channel may include information indicating the index of the spreading code to be applied to the long PUCCH. The downlink control channel may be information common to a group terminal or all terminals in a cell, or may be dedicated information transmitted only to a specific terminal.

In step 923, the terminal applies a spreading code having the spreading code index indicated in the above step and frequency hopping and transmits the uplink control channel to the base station at the short PUCCH or long PUCCH transmission time and in the frequency resource, which are received in step 921 or step 922.

Figure 10:
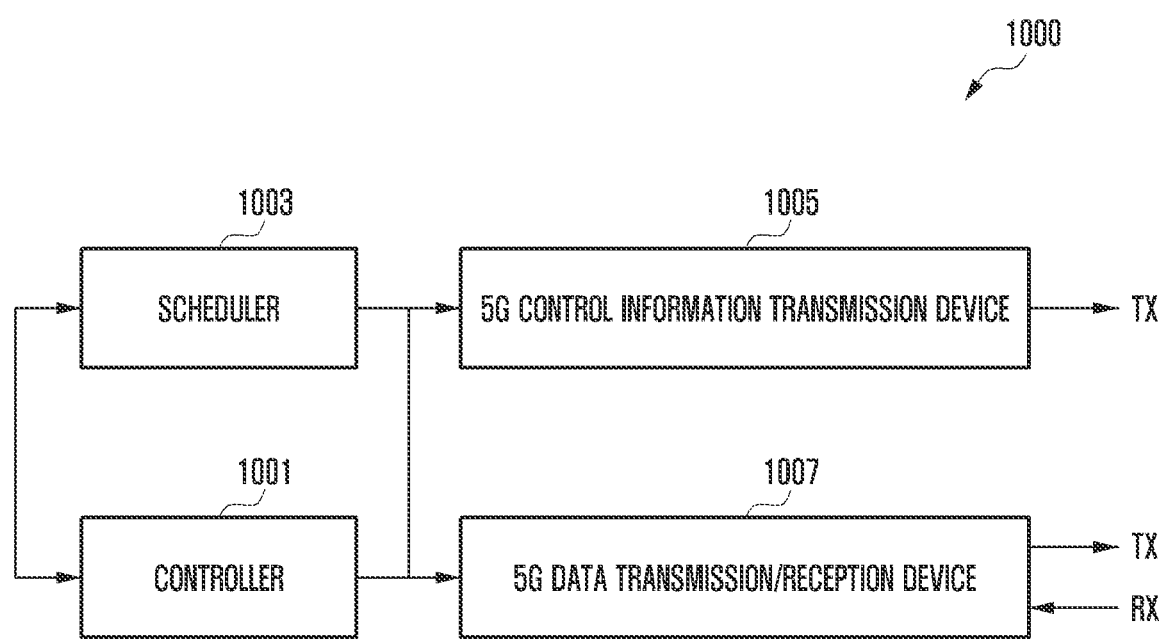
FIG. 10 is a diagram illustrating a base station device according to the disclosure.

Next, FIG. 10 is a diagram illustrating a base station device 1000 according to the disclosure A controller 1001 controls uplink control channel transmission resources according to the procedure of the base station described with reference to FIGS. 5 and 9 of the disclosure, and the method of configuring an uplink control channel and configuring time and frequency transmission resources with respect to the uplink control channel, the method of configuring and applying frequency hopping, and the method of applying spreading code described with reference to FIGS. 4, 7, and 8, thereby transmitting the uplink control channel to the terminal through a 5G control information transmission device 1005 and a 5G data transmission/reception device 1007, and a scheduler 1003 schedules 5G data and transmits/receives the same to/from the 5G terminal through the 5G data transmission/reception device 1007.

Figure 11:
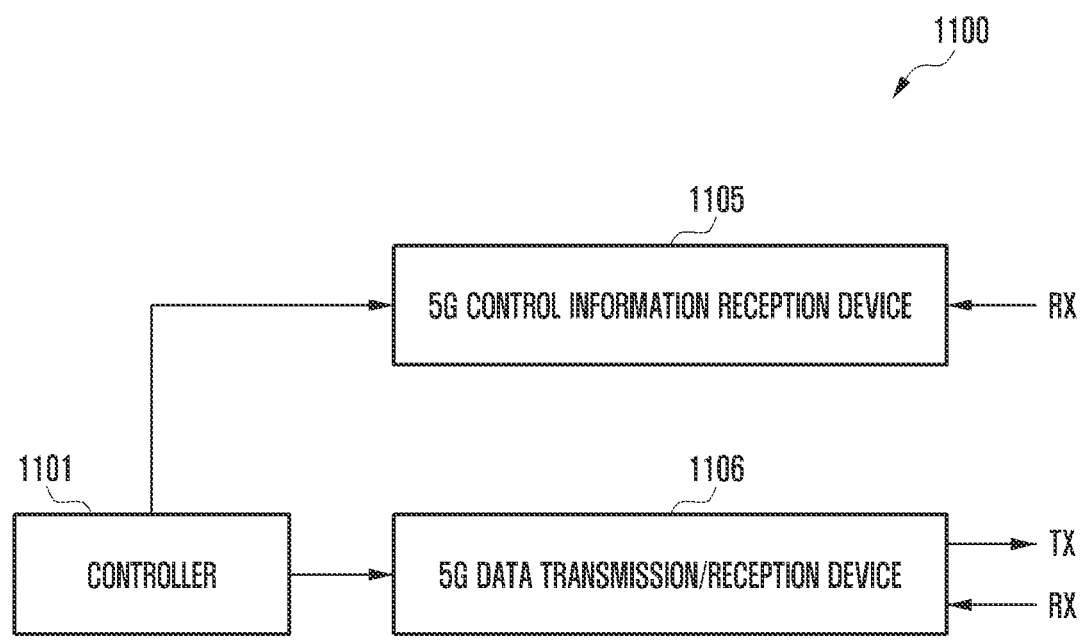
FIG. 11 is a diagram illustrating a terminal device according to the disclosure.

Next, FIG. 11 is a diagram illustrating a terminal device 1100 according to the disclosure.

The terminal receives the uplink control channel transmission resource position from a base station through a 5G control information reception device 1105 and a 5G data transmission/reception device 1106 according to the procedure of the terminal described with reference to FIGS. 5 and 9 of the disclosure, and the method of configuring an uplink control channel and configuring time and frequency transmission resources with respect to the uplink control channel, the method of configuring and applying frequency hopping, and the method of applying spreading code described with reference to FIGS. 4, 7, and 8, and a controller 1101 transmits/receives scheduled 5G data to/from a 5G base station in the received resource position through the 5G data transmission/reception device 1106.

The embodiments disclosed in the specifications and drawings are provided merely to readily describe and to help a thorough understanding of the disclosure but are not intended to limit the scope of the disclosure. Therefore, it should be construed that, in addition to the embodiments disclosed herein, all modifications and changes or modified and changed forms derived from the technical idea of the disclosure fall within the scope of the disclosure.

The invention claimed is:

1. A method performed by a terminal for transmitting an uplink signal in a wireless communication system, the method comprising:
   receiving, from a base station, a higher layer signal comprising first information indicating an orthogonal cover code (OCC) index for a long physical uplink control channel (PUCCH) format;
   generating uplink control information to be transmitted on a PUCCH based on the long PUCCH format;
   determining N symbols in which the uplink control information is to be transmitted; and
   transmitting, to the base station on the PUCCH based on the long PUCCH format, the uplink control information and a demodulation reference signal (DMRS),
   wherein:
   a first spreading code for a first uplink control information symbol in a first hop is determined based on the first information and a first symbol duration of the first uplink control information symbol, a second spreading code for a first DMRS symbol in the first hop is determined based on the first information and a second symbol duration of the first DMRS symbol, a third spreading code for a second uplink control information symbol in a second hop is determined based on the first information and a third symbol duration of the second uplink control information symbol, and a fourth spreading code for a second DMRS symbol in the second hop is determined based on the first information and a fourth symbol duration of the second DMRS symbol.

2. The method of claim 1,
wherein the higher layer signal further comprises second information on a number of symbols for the long PUCCH format, third information enabling frequency hopping for the long PUCCH format in a slot, fourth information on a frequency resource of the first hop and fifth information on a frequency resource of the second hop.

3. The method of claim 2,
wherein the N symbols is determined based on the second information, and
wherein the uplink control information and the DMRS are transmitted by applying the frequency hopping based on the third information.

4. The method of claim 1,
wherein the uplink control information and the DMRS for the uplink control information are mapped to the N symbols, and
wherein a number of symbols in the first hop is floor(N/2) and a number of symbols in the second hop is ceil(N/2).

5. A terminal for transmitting an uplink signal in a wireless communication system, the terminal comprising:
a transceiver configured to transmit and receive signals; and
a controller configured to:
receive, from a base station, a higher layer signal comprising first information indicating an orthogonal cover code (OCC) index for a long physical uplink control channel (PUCCH) format,
generate uplink control information to be transmitted on a PUCCH based on the long PUCCH format,
determine N symbols in which the uplink control information is to be transmitted, and
transmit, to the base station on the PUCCH based on the long PUCCH format, the uplink control information and a demodulation reference signal (DMRS),
wherein:
a first spreading code for a first uplink control information symbol in a first hop is determined based on the first information and a first symbol duration of the first uplink control information symbol,
a second spreading code for a first DMRS symbol in the first hop is determined based on the first information and a second symbol duration of the first DMRS symbol,
a third spreading code for a second uplink control information symbol in a second hop is determined based on the first information and a third symbol duration of the second uplink control information symbol, and a fourth spreading code for a second DMRS symbol in the second hop is determined based on the first information and a fourth symbol duration of the second DMRS symbol.

6. The terminal of claim 5,
wherein the higher layer signal further comprises second information on a number of symbols for the long PUCCH format, third information enabling frequency hopping for the long PUCCH format in a slot, fourth information on a frequency resource of the first hop and fifth information on a frequency resource of the second hop.

7. The terminal of claim 6,
wherein the N symbols is determined based on the second information, and
wherein the uplink control information and the DMRS are transmitted by applying the frequency hopping based on the third information.

8. The terminal of claim 5,
wherein the uplink control information and the DMRS for the uplink control information are mapped to the N symbols, and
wherein a number of symbols in the first hop is floor(N/2) and a number of symbols in the second hop is ceil(N/2).

9. A method performed by a base station for receiving an uplink signal in a wireless communication system, the method comprising:
transmitting, to a terminal, a higher layer signal comprising first information indicating an orthogonal cover code (OCC) index for a long physical uplink control channel (PUCCH) format; and
receiving, from the terminal on a PUCCH based on the long PUCCH format, uplink control information and a demodulation reference signal (DMRS) for the uplink control information based on N symbols,
wherein:
a first spreading code for a first uplink control information symbol in a first hop is determined based on the first information and a first symbol duration of the first uplink control information symbol,
a second spreading code for a first DMRS symbol in the first hop is determined based on the first information and a second symbol duration of the first DMRS symbol,
a third spreading code for a second uplink control information symbol in a second hop is determined based on the first information and a third symbol duration of the second uplink control information symbol, and
a fourth spreading code for a second DMRS symbol in the second hop is determined based on the first information and a fourth symbol duration of the second DMRS symbol.

10. The method of claim 9,
wherein the higher layer signal further comprises second information on a number of symbols for the long PUCCH format, third information enabling frequency hopping for the long PUCCH format in a slot, fourth information on a frequency resource of the first hop and fifth information on a frequency resource of the second hop.

11. The method of claim 10,
wherein the N symbols is determined based on the second information, and
wherein the uplink control information and the DMRS are transmitted by applying the frequency hopping based on the third information.

12. The method of claim 9,
wherein the uplink control information and the DMRS for the uplink control information are mapped to the N symbols, and
wherein a number of symbols in the first hop is floor(N/2) and a number of symbols in the second hop is ceil(N/2).

13. A base station for receiving an uplink signal in a wireless communication system, the base station comprising:
a transceiver configured to transmit and receive signals; and
a controller configured to:
transmit, to a terminal, a higher layer signal comprising first information indicating an orthogonal cover code (OCC) index for a long physical uplink control channel (PUCCH) format, and
receive, from the terminal on a PUCCH based on the long PUCCH format, uplink control information and a demodulation reference signal (DMRS) for the uplink control information which are mapped to N symbols,
wherein:
a first spreading code for a first uplink control information symbol in a first hop is determined based on the first information and a first symbol duration of the first uplink control information symbol,
a second spreading code for a first DMRS symbol in the first hop is determined based on the first information and a second symbol duration of the first DMRS symbol,
a third spreading code for a second uplink control information symbol in a second hop is determined based on the first information and a third symbol duration of the second uplink control information symbol, and
a fourth spreading code for a second DMRS symbol in the second hop is determined based on the first information and a fourth symbol duration of the second DMRS symbol.

14. The base station of claim 13,
wherein the higher layer signal further comprises second information on a number of symbols for the long PUCCH format, third information enabling frequency hopping for the long PUCCH format in a slot, fourth information on a frequency resource of the first hop and fifth information on a frequency resource of the second hop.

15. The base station of claim 14,
wherein the N symbols is determined based on the second information, and
wherein the uplink control information and the DMRS are transmitted by applying the frequency hopping based on the third information.

16. The base station of claim 13,
wherein the uplink control information and the DMRS for the uplink control information are mapped to the N symbols, and
wherein a number of symbols in the first hop is floor(N/2) and a number of symbols in the second hop is ceil(N/2).

\* \* \* \* \*